United States Patent [19]
Kigami et al.

[11] Patent Number: 5,205,701
[45] Date of Patent: Apr. 27, 1993

[54] INDUSTRIAL ROBOT

[75] Inventors: Hiroyuki Kigami, Yokohama; Masateru Yasuhara, Kawasaki; Katsumi Ishihara, Yokohama; Yasuhiro Sawada, Chofu, all of Japan

[73] Assignee: Canon Kabushiki Kaisha, Tokyo, Japan

[21] Appl. No.: 709,028

[22] Filed: May 31, 1991

[30] Foreign Application Priority Data

| Jun. 4, 1990 | [JP] | Japan | 2-146432 |
| Feb. 19, 1991 | [JP] | Japan | 3-24326 |
| Feb. 19, 1991 | [JP] | Japan | 3-24327 |

[51] Int. Cl.$^5$ ............................. B25J 18/04
[52] U.S. Cl. ................. 414/744.5; 285/305; 285/403; 285/903; 403/322; 403/328; 403/342; 901/15; 414/918
[58] Field of Search ........ 414/744.5, 918; 901/15, 901/28, 29, 50; 403/322, 325, 328, 342; 285/903, 305, 403, 386; 74/469, 479

[56] References Cited

U.S. PATENT DOCUMENTS

| 4,518,298 | 5/1985 | Yasukawa | 901/21 X |
| 4,664,588 | 5/1987 | Newell et al. | 901/29 X |
| 4,723,796 | 2/1988 | Nattel | 285/305 X |
| 4,969,795 | 11/1990 | Toyada et al. | 414/918 X |
| 4,990,022 | 2/1991 | Watanabe et al. | 403/322 X |
| 4,993,132 | 2/1991 | Manz | 901/50 X |
| 5,000,653 | 3/1991 | Gosdowski | 414/744.5 |

FOREIGN PATENT DOCUMENTS

| 3634032 | 4/1988 | Fed. Rep. of Germany | 901/28 |
| 37-68788 | 3/1962 | Japan . | |
| 38-31912 | 3/1963 | Japan . | |
| 38-36913 | 7/1963 | Japan . | |
| 38-500505 | 2/1988 | Japan . | |

Primary Examiner—Michael S. Huppert
Assistant Examiner—Donald W. Underwood
Attorney, Agent, or Firm—Fitzpatrick, Cella, Harper & Scinto

[57] ABSTRACT

A bundle of wiring and piping lines, for supplying a control signal and working a first arm from a control unit to a hand, passes through a first flexible pipe, one end of which is connected onto a fixing jig attached to a base unit and the other end of which is connected onto a second arm, a second flexible pipe, one end of which is connected onto the second arm and the other end of which is connected onto a hollow third arm, and the third arm. One end of the bundle is connected to the control unit and the other end thereof is connected to the hand.

9 Claims, 19 Drawing Sheets

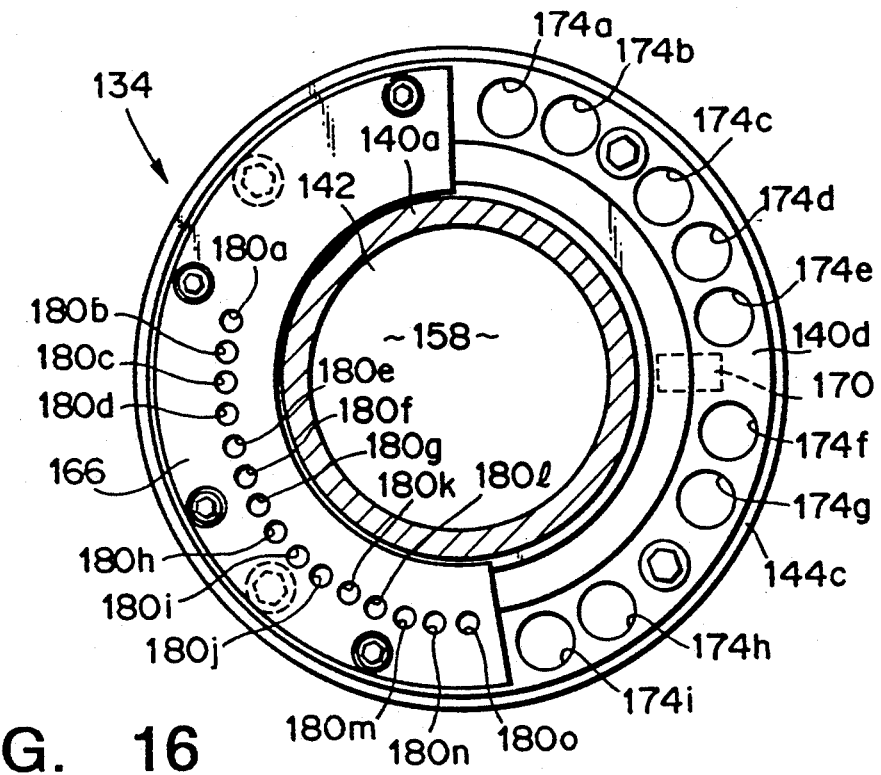
F I G. 16
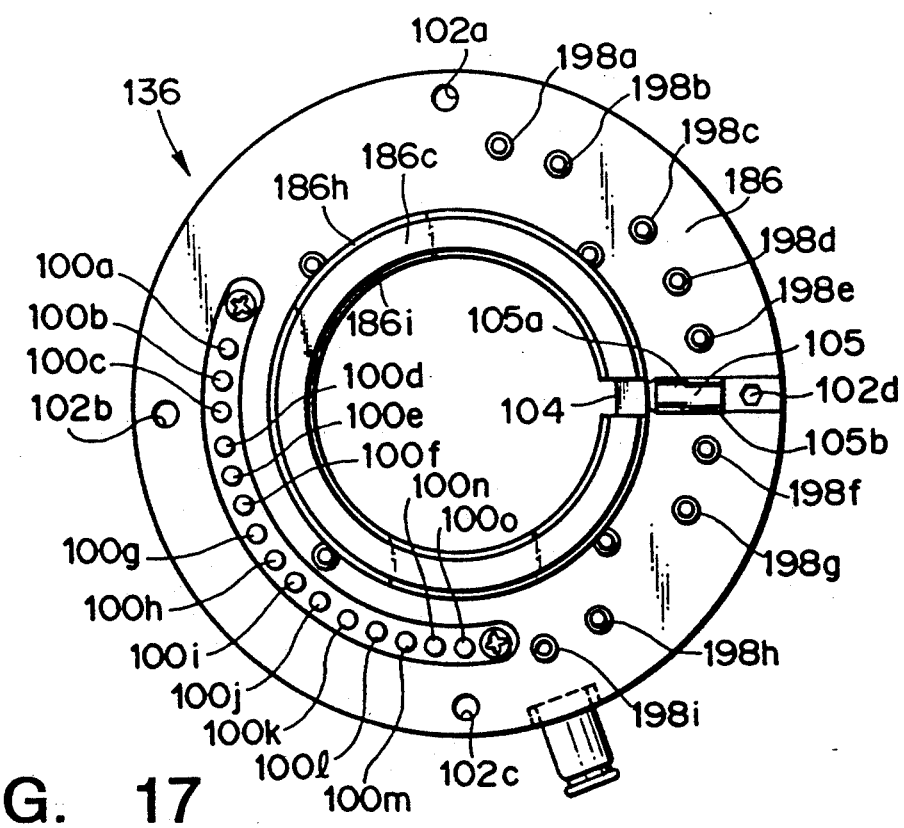
F I G. 17

INDUSTRIAL ROBOT

BACKGROUND OF THE INVENTION

The present invention relates to an industrial robot such as a horizontal multijoint robot with an improved wiring/piping system in a robot main body.

As a conventional wiring/piping system in a horizontal multijoint robot, techniques disclosed in Japanese Patent Laid-Open No. 62-68788, Japanese Patent Publication Nos. 63-500505 and 63-36913, Japanese Utility Model Publication No. 63-31912, and the like are known.

More specifically, in a wiring/piping mechanism disclosed in Japanese Patent Laid-Open No. 62-68788, as shown in FIG. 1, wiring/piping lines are connected from a junction box a to a rear portion of a first arm c via a first pipe b, are connected from the first arm c to a second arm e via a second pipe d, are connected from the second arm e to a vertically movable table g, which is vertically movably supported, via a third pipe f, and are finally connected to a finger h attached to the lower end of the vertically movable table g.

In a wiring/piping mechanism disclosed in Japanese Patent Publication No. 63-500505, as shown in FIG. 2, wiring/piping lines are connected from a base i to a second arm e via a first pipe b, are connected from the second arm e, via a second pipe d, to a driving mechanism k which is attached to the distal end of the second arm e so as to vertically move and rotate a vertical arm j, and are finally connected to a finger h attached to the lower end of the vertical arm j.

As another conventional wiring/piping means, a structure shown in FIG. 3 is known. In this structure, wiring/piping lines are connected from a junction box a, via a first pipe b, to a fixing jig m mounted on a first arm c, are connected from the jig m to the upper end of a hollow vertical arm j via a second pipe d, and are then connected to a finger h attached to the lower end of the vertical arm j via the interior of the vertical arm j.

On the other hand, a wiring/piping mechanism disclosed in Japanese Patent Publication No. 63-36913 comprises first and second flexible pipes b and d for supplying a control signal to a driving source of a finger h, and supplying compressed air as a working fluid, as shown in FIG. 4. One end of the first pipe b is connected onto a first arm c which is located on substantially the center of rotation of a second arm e, and the other end thereof is connected to a wiring/piping fixing jig l fixed to a base i. One end of the second pipe d is connected to the upper end of a block k to which a third arm j is vertically movably attached, and the other end thereof is connected to the first arm c which is located on substantially the center of rotation of the second arm e.

In a wiring/piping mechanism disclosed in Japanese Utility Model Publication No. 63-31912, as shown in FIG. 5, wiring/piping lines connected up to a first arm c are connected to a fixing jig n in a spiral pattern m, are connected from the jig n to a fixing jig q fixed to a base i via a U-shaped pipe p, and are then connected from the jig q into the base i in a spiral pattern r.

However, in the prior art shown in FIG. 1, a bundle of wiring/piping lines may be entangled around the finger h upon rotation of the finger h. In particular, when the bundle of wiring/piping lines includes a large number of lines, it is substantially impossible to prevent these lines from being entangled around the finger h.

Since the bundle of wiring/piping lines is connected from the vertically movable table g to the second arm e via the third pipe f, is connected from the second arm e to the first arm c via the second pipe d, and is then connected to the junction box a via the first pipe b, a total of three pipes b, d, and f are required. In this manner, problems causing an increase in cost including connection of wiring/piping lines and working of, e.g., jigs for fixing pipes are posed.

When the first arm c is rotated, the first and second pipes b and d interfere with each other. Connection positions of the second and third pipes d and f to the second arm e are separated far away from the center of rotation of the second arm e, and when the second arm e is rotated, a distance between nuts e1 and e2 for fixing the two ends of the second pipe d is largely changed. As a result, the second pipe d is considerably swung upon rotation of the first arm c.

In the prior art shown in FIG. 2, since the bundle of wiring/piping lines is connected from the second arm e to the driving mechanism k, and is then connected to the finger h, the bundle is entangled around the vertical arm j and the finger h upon vertical movement and pivotal movement of the finger h about the vertical axis. The connection positions of the first and second pipes b and d are separated far away from the center of rotation of the second arm e, and like in the prior art shown in FIG. 1, when the second arm e is rotated, the distance between nuts e1 and e2 for fixing the two ends of the second pipe d is considerably changed. As a result, the second pipe d is considerably swung upon rotation of the first arm c.

In the prior art shown in FIG. 3, since the bundle of wiring/piping lines from the finger h extends through the vertical arm j, they can be prevented from being entangled around the vertical arm j upon vertical movement and pivotal movement of the vertical arm j. However, since the bundle of wiring/piping lines extending from the upper portion of the vertical arm j is connected to the fixing jig m on the first arm c via the second pipe d, the bundle of wiring/piping lines in the second pipe d receives excessive torsion since they absorb torsion caused by vertical movement and pivotal movement of the vertical arm j and pivotal movement of the second arm e, thus posing a large problem on the durability and reliability of the wiring/piping lines.

The durability of a bundle of wiring/piping lines will be examined below. A bundle used here is a robot cable, and is obtained by twisting and bundling lines having cores smaller than those in a normal cable. As a result, this bundle has high flexibility, and has durability against bending and torsion ten times or more than a normal cord.

Durability tests are conducted in such a manner that a cable n is bent at 90° to the right and left at a rate of 60 times/minute to have a bending radius of 17.5 mm. As a result, it was demonstrated that the cable was disconnected after about two million times. Although a cable arranged in an actual robot does not suffer from such a severe condition, i.e., a bending radius of 17.5 mm, torsion as a factor for impairing the durability of the cable is mainly caused by bending, and the number of times of bending reaches ten thousands times/day depending on a use state of a robot. Therefore, the wiring method in the robot must be sufficiently examined so as not to apply a stress on a cable.

In the prior art shown in FIG. 4, since the wiring-/piping fixing jig l is offset from the center of rotation of the first arm c, when the first arm c is rotated, the distance between fixing nuts b1 and b2 of the first pipe b is largely changed. For this reason, when the distance between the nuts is decreased, a height H of the first pipe b is increased, as shown in FIG. 7A, and the first pipe b is inclined upon rotation of the first arm c. As a result, a large load caused by the inclined pipe b acts on the nuts b1 and b2. On the other hand, when the distance between the nuts is increased, the height of the first pipe b is decreased, as shown in FIG. 7B, and a large load also acts on the nuts b1 and b2. In this manner, the first pipe b may be undesirably disengaged at the nuts b1 and b2 at its two ends.

In particular, since the degree of freedom of the finger h is increased, and the number of wiring/piping lines to the finger h tends to be increased in recent years, the number of wiring/piping lines extending through the first pipe b may exceed 10 if they include a wiring line for a control signal to an arm driving motor. For this reason, the inclination of the first pipe b when the first arm c is turned is further increased, and a thick pipe member is used. Therefore, in order to store a large number of wiring/piping lines, and to maintain these lines in an upright state, the rigidity of the pipe member must be increased, and a load acting on the nuts b1 and b2 is increased accordingly.

In the conventional wiring/piping system, since the second pipe d is connected to the upper portion of the first arm c, wiring/piping lines extending through the second pipe d must absorb torsion caused upon rotation of the second arm e, and torsion caused upon rotation and vertical movement of the third arm j, thus considerably impairing the durability and reliability of the wiring/piping lines.

Furthermore, in the prior art shown in FIG. 5, a wiring line o extending from the first arm c passes through the interior of the U-shaped pipe p in the spiral pattern m, and is then connected to the base g in the spiral pattern r. As a result, even when the first arm c is rotated, torsion of wiring lines caused by this rotation is absorbed by the spiral portions m and r, and the durability of the wiring lines and the like can be guaranteed. However, since the two spiral wiring portions are required, and the U-shaped pipe p is arranged therebetween, the numbers of steps in the manufacture of the fixing jigs, and in assembling and connection of wiring lines are increased, resulting in an increase in cost. In addition, such a structure makes maintenance difficult.

SUMMARY OF THE INVENTION

The present invention has been made in consideration of the above situation, and has as its object to provide an industrial robot which can prevent excessive torsion of wiring/piping lines, and can improve durability and reliability.

It is another object of the present invention to provide an industrial robot which can prevent an excessive load from acting on wiring/piping lines, and can improve durability and reliability.

It is still another object of the present invention to provide an industrial robot which can decrease the number of steps in the manufacture of fixing jigs, and in assembling and connection of wiring lines, and can decrease cost.

It is still another object of the present invention to provide an industrial robot which can accurately receive a signal sent from a control mechanism via a cable.

It is still another object of the present invention to provide an industrial robot which can accurately communicate between a control mechanism and a hand means even when a robot arm and the hand means are turned or rotated.

In order to achieve the above objects, an industrial robot according to the first aspect of the present invention comprises a base unit, a first arm, one end of which is rotatably attached to the base unit, a second arm, one end of which is rotatably attached to the other end portion of the first arm, a hollow third arm which is vertically movably, and rotatably mounted on the other end portion of the second arm, and to a lower end of which hand means for holding parts is detachably attached, driving means for driving the first to third arms, control means for controlling the driving means, and wiring/piping means for supplying a control signal from the control means to the driving means, and supplying a control signal and a working fluid from the control means to the hand means. The wiring/piping means includes a fixing jig attached to the base unit, a flexible first pipe, one end of which is connected onto the fixing jig, and the other end of which is connected onto the second arm, a flexible second pipe, one end of which is connected onto the second arm, and the other end of which is connected onto the third arm, and a bundle of wiring/piping lines, which passes through the first pipe, the second pipe, and the third arm, so that one end thereof is connected to the control means, and the other end thereof is connected to the hand means, for supplying the control signal and the working fluid from the control means to the hand means.

An industrial robot according to the second aspect of the present invention comprises a base unit, a first arm, one end of which is attached to the base unit to be rotatable about a first axis, a second arm, one end of which is attached to the other end portion of the first arm to be rotatable about a second axis, a third arm which is attached to the other end portion of the second arm to be vertically movable along a third axis, and to be rotatable about the third axis, and to a lower end of which hand means for holding parts is detachably attached, driving means for driving the first to third arms, control means for controlling the driving means, and wiring/piping means for supplying a control signal from the control means to the driving means, and supplying a control signal and a working fluid from the control means to the hand means. The wiring/piping means includes a first fixing jig extending to a position above the first arm and above the first axis, a second fixing jig arranged on the second arm and on the second axis, a third fixing jig arranged on an upper end of the third arm and on the third axis, a first pipe, one end of which is connected on the first axis on the first fixing jig, the other end of which is connected to a position near the second axis on the second fixing jig, and through which a bundle of wiring/piping lines is inserted, and a second pipe, one end of which is connected to a position near the second axis on the second fixing jig, the other end of which is connected on the third axis on the third fixing jig, and through which the bundle of wiring/piping lines is inserted.

An industrial robot according to the third aspect of the present invention comprises a robot main body comprising a hollow vertical arm, hand attaching-/detaching means attached to a lower end of the vertical arm, hand means detachably attached to the lower end of the vertical arm via the hand attaching/detaching means, control means for controlling a driving operation of the hand means, and a wiring cable, inserted through the hollow vertical arm, for performing a communication of a control signal between the control means and the hand means. The hand attaching/detaching means comprises a cylindrical main body attached to the lower end of the vertical arm, and the cylindrical main body has an opening for externally guiding the wiring cable passing through the vertical arm and extending into the cylindrical main body.

According to the fourth aspect of the present invention, in a robot in which hand means for performing a working or assembling operation is attached to a distal end of a robot arm via attaching/detaching means, the robot arm receives therein, via an interior of a hollow arm connected to the robot arm, a transmission cable for transmitting a signal from a control circuit for controlling the robot, and supply means for supplying a driving force for actuating the attaching/detaching means, the attaching/detaching means comprises substantially cylindrical first coupling means attached to the robot arm side, and substantially cylindrical second coupling means attached to the hand means side, and detachably coupled to the first coupling means, the supply means is connected to the first coupling means, the hand means comprises a plurality of actuators, the transmission cable is constituted by a plurality of signal lines for controlling the plurality of actuators of the hand means, and the plurality of signal lines execute signal exchange between the hand means and the robot arm via signal transmission means arranged on an outer circumferential surface of the first coupling means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a cross-sectional view of the hand attaching/detaching mechanism taken along line A—A in FIG. 12;

FIG. 17 is a plan view showing an upper structure of a shank main body of the hand attaching/detaching mechanism;

DETAILED DESCRIPTION OF THE PREFERRED EMBODIMENT

A structure of an industrial robot according to an embodiment of the present invention will be described in detail hereinafter with reference to FIGS. 8 to 21.

Figure 1:
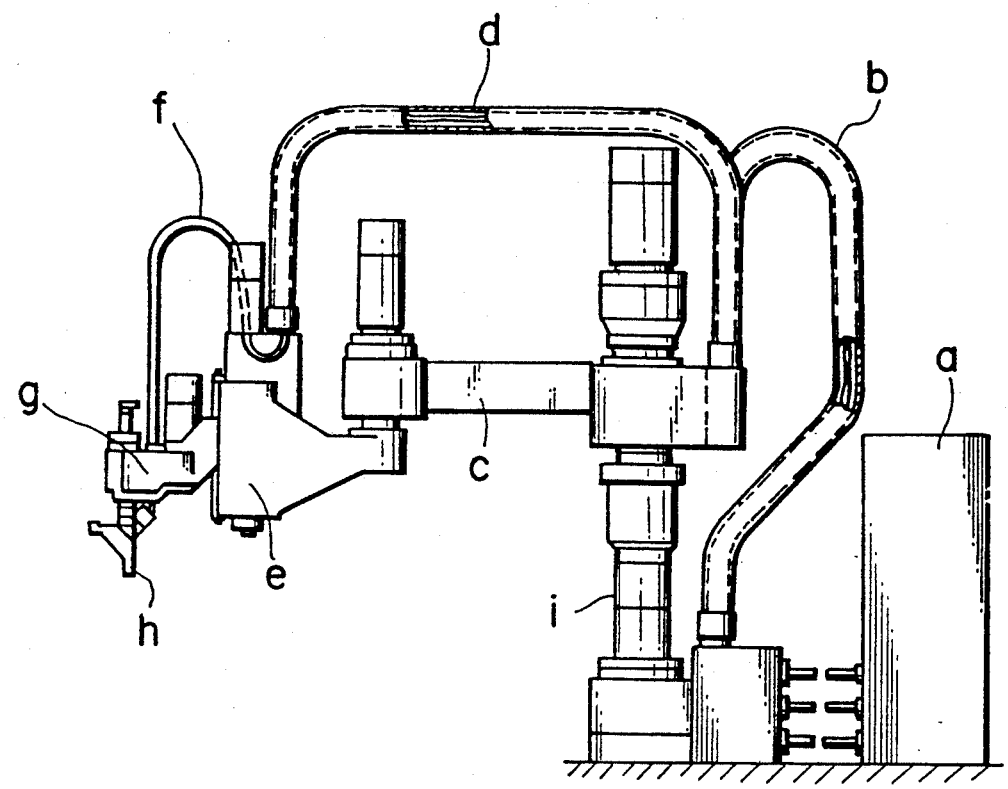
FIGS. 1 to 5 are front views respectively showing first to fifth prior art robots.
Figure 2:
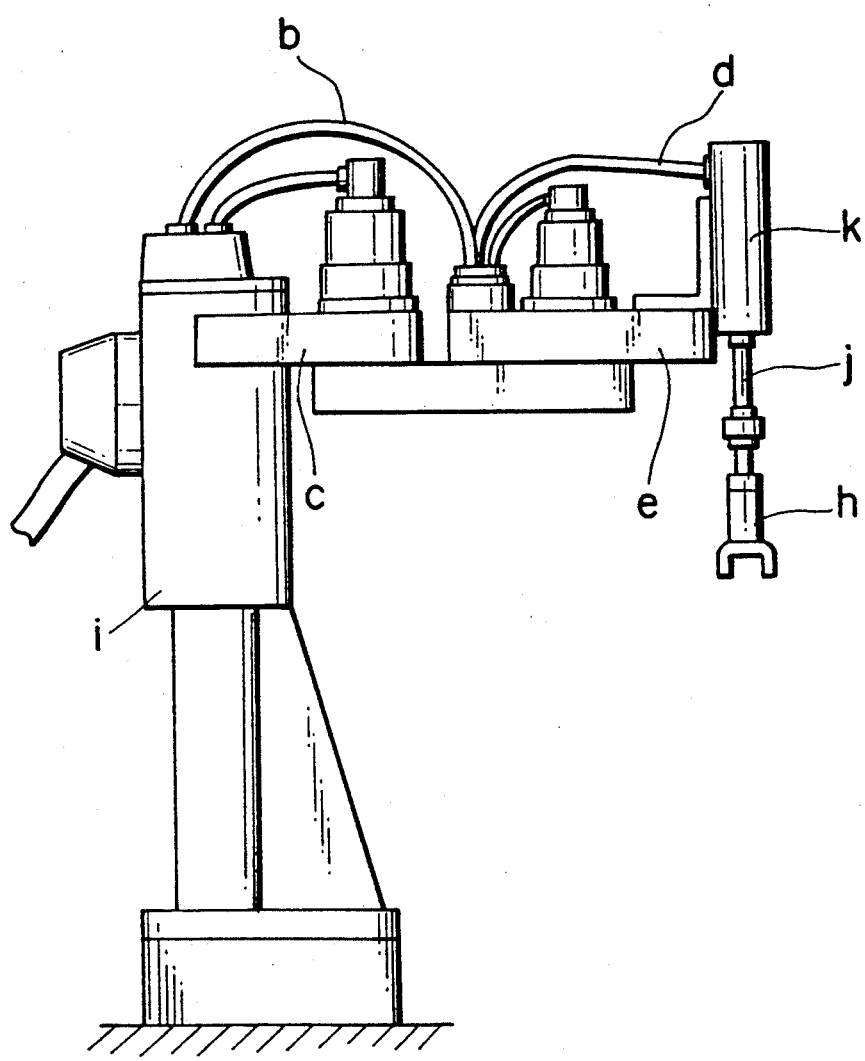
Figure 3:
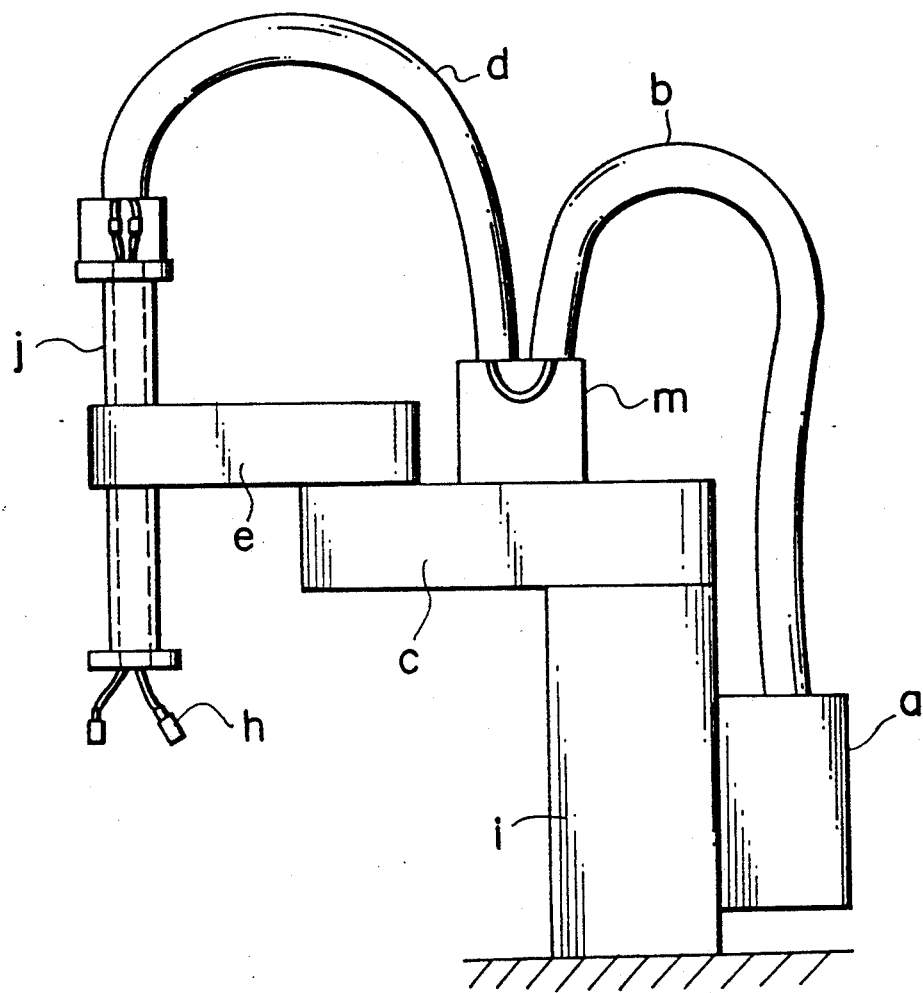
Figure 4:
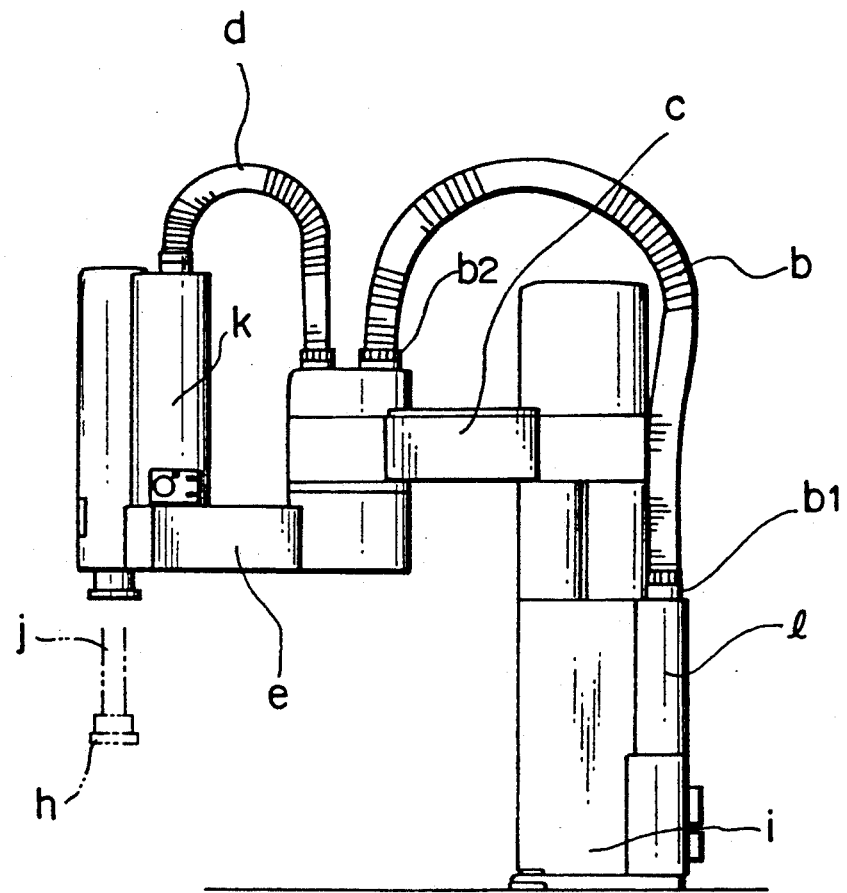
Figure 5:
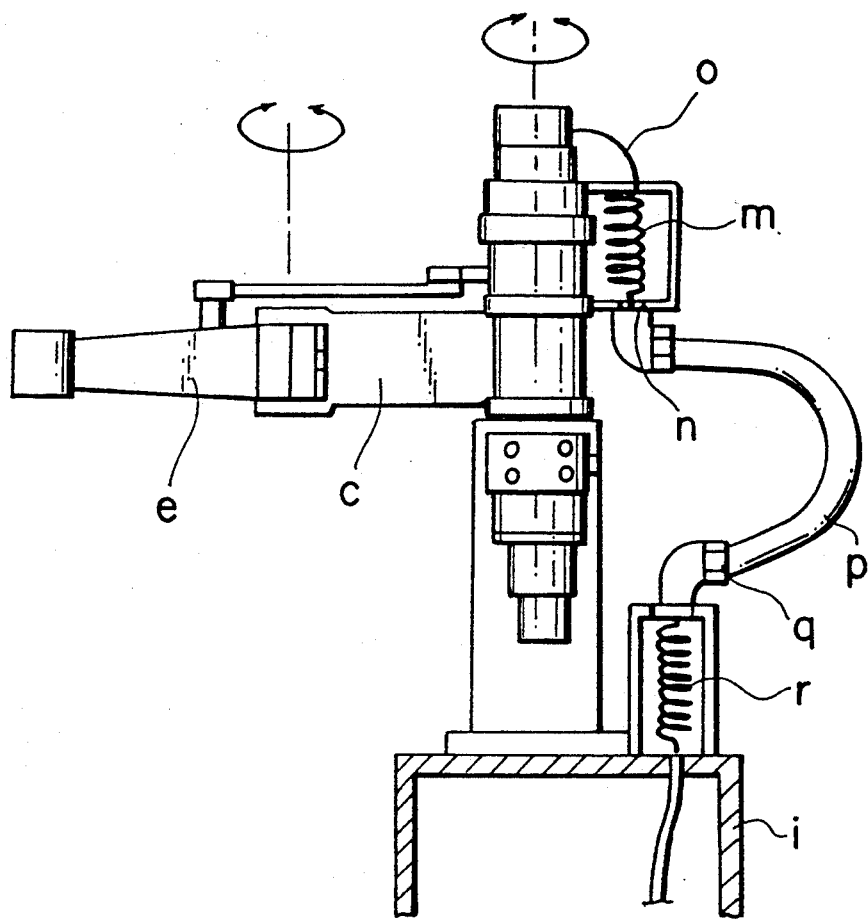
Figure 6:
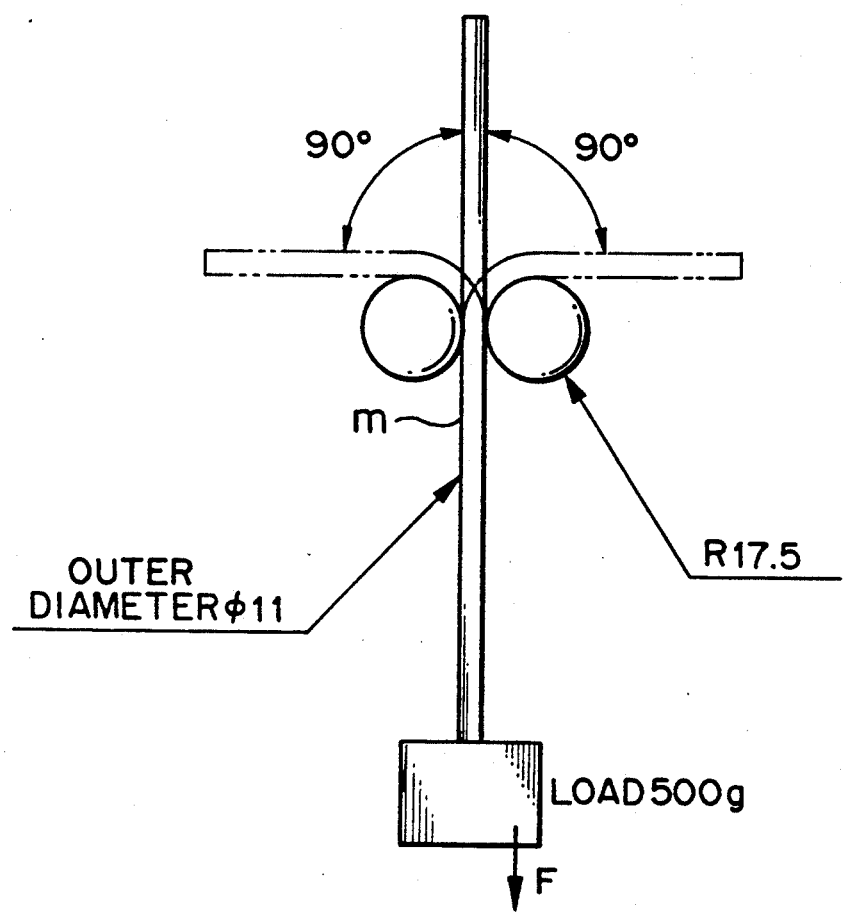
FIG. 6 is a schematic view for explaining an operation state of a durability test of a cable.
Figure 7A:
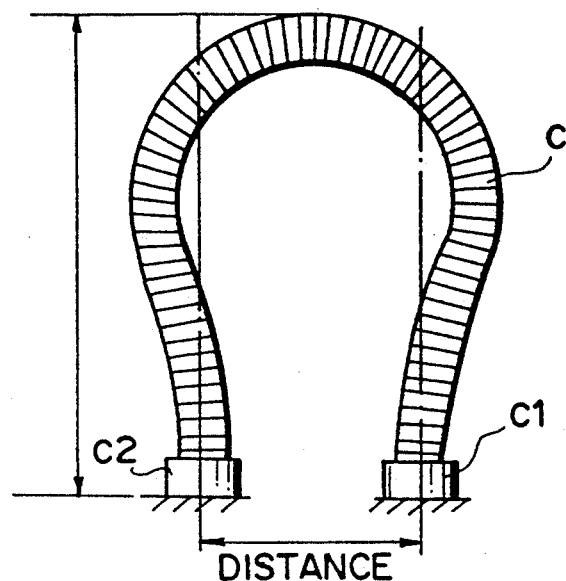
FIGS. 7A and 7B are views for explaining problems in the fourth prior art robot shown in FIG. 4.
Figure 7B:
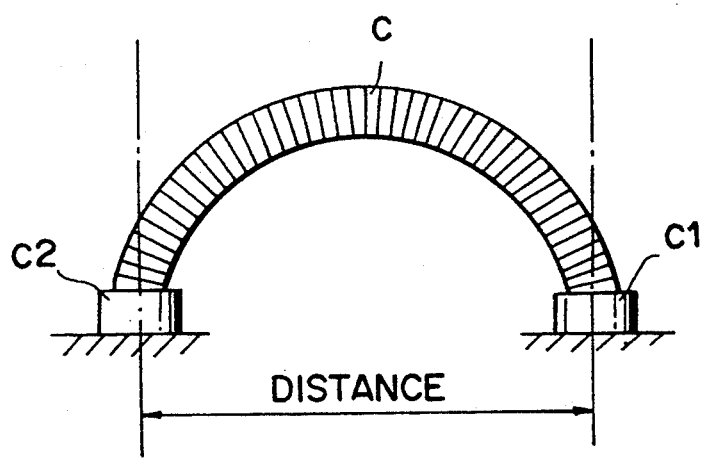
Figure 8:
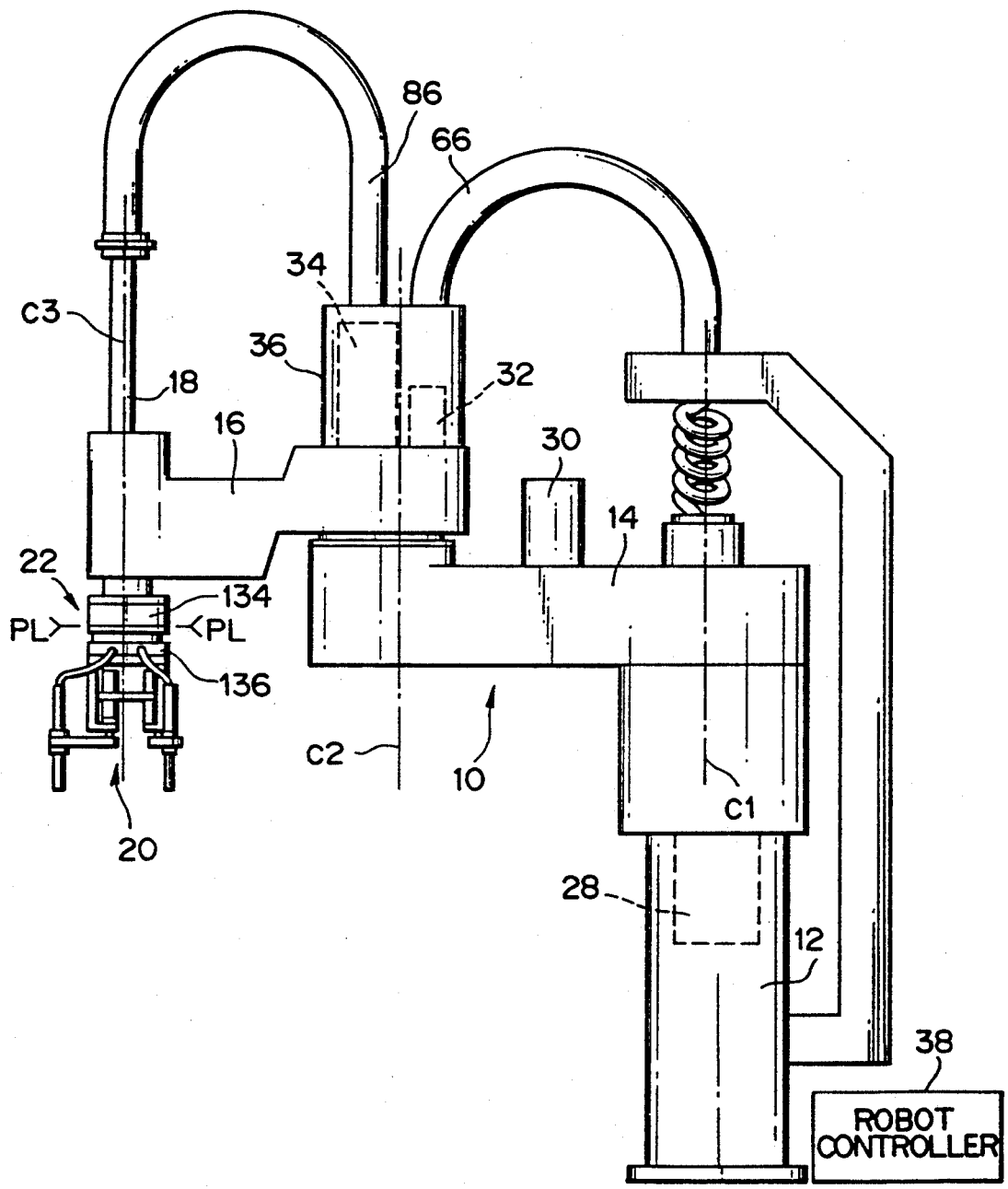
FIG. 8 is a schematic front view showing the structure of an industrial robot according to an embodiment of the present invention.

As shown in FIG. 8, an industrial robot 10 of this embodiment comprises a hollow cylindrical base unit 12 fixed upright on a foundation (not shown). The proximal end portion of a first horizontal arm 14 is mounted on the upper end portion of the base unit 12 to be pivotal about a first vertical axis C1 in the horizontal plane. The proximal end portion of a second horizontal arm 16 is mounted on the distal end portion of the first horizontal arm 14 to be pivotal about a second vertical axis C2 in the horizontal plane. A vertical arm 18 is mounted on the distal end portion of the second horizontal arm 16 to be pivotal about a third vertical axis C3 and to be movable along the third vertical axis C3.

The vertical arm 18 is formed of a hollow pipe member. A hand mechanism 20 for holding parts (not shown) is detachably attached to the lower end of the vertical arm 18 via a hand attaching/detaching mechanism 22 (synonymously a hand attaching or detaching mechanism or a hand attaching and detaching mechanism). A plurality of openings (not shown) for extracting a bundle 24 of wiring/piping (synonymously wiring or piping or wiring and piping) lines extending through the vertical arm 18 to the outside are formed on the outer circumferential surface of the hand attaching-/detaching mechanism 22. The structure of the hand attaching/detaching mechanism 22 will be described in detail later with reference to FIGS. 12 to 21.

Figure 9:
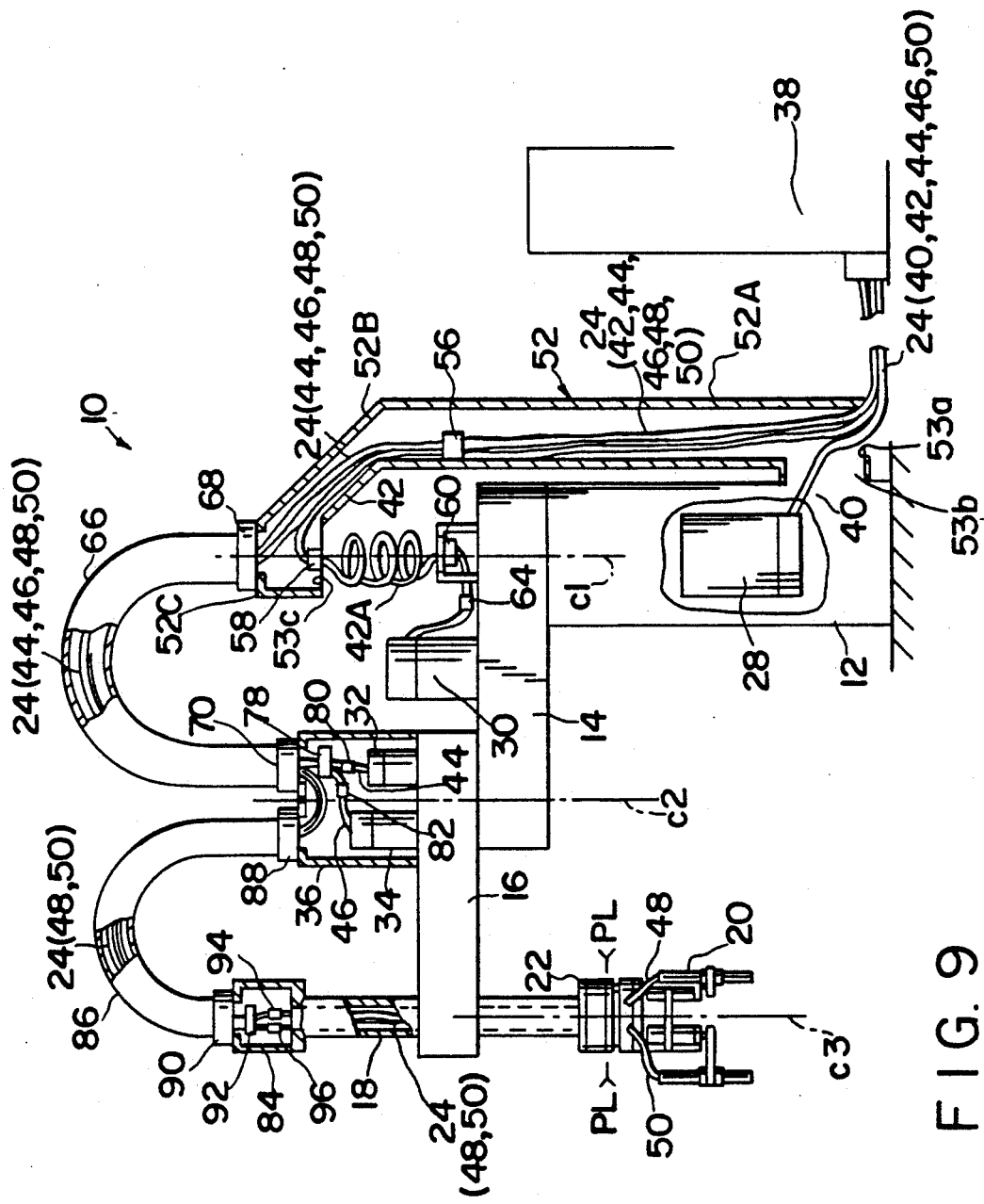
FIG. 9 is a partial cutaway front view showing an extending state of a bundle of wiring/piping lines in the industrial robot shown in FIG. 8.

The base unit 12 described above stores a first driving motor 28 for rotating the first horizontal arm 14, as shown in FIG. 9. A second driving motor 30 for rotating the second horizontal arm 16 is mounted at substantially the central portion in the longitudinal direction on the first horizontal arm 14. Furthermore, a third driving motor 32 for vertically moving the vertical arm 18, and a fourth driving motor 34 for pivoting the vertical arm 18 are juxtaposed on the proximal end portion of the second horizontal arm 16, i.e., a rotational central portion of the second horizontal arm 16 so as to sandwich the second vertical axis C3 therebetween. These third and fourth driving motors 32 and 34 are stored in a third fixing jig 36, arranged on the proximal end portion of the second horizontal arm 16, for fixing wiring lines to the third and fourth driving motors 32 and 34.

A robot controller 38 for controlling driving operations of the first to fourth driving motors 28, 30, 32, and 34, and the hand mechanism 20 are placed on a foundation (not shown). The controller 38, the driving motors 28, 30, 32, and 34, and the hand mechanism 20 are connected via first to fifth wiring cables 40, 42, 44, 46, and 48, so that control signals are supplied from the controller 38 to the driving motors 28, 30, 32, and 34, and the hand mechanism 20 via these wiring cables 40, 42, 44, 46, and 48.

The hand mechanism 20 is driven by compressed air as a working fluid in this embodiment. For this purpose, a pneumatic tube 50 as a pipe for connecting the hand mechanism 20 to a pneumatic source (not shown) is connected to the hand mechanism 20. The pneumatic tube 50 is also connected to the controller 38 so as to be subjected to ON/OFF control of supply of compressed air by the controller 38. The bundle 24 of wiring/piping lines is constituted by these first to fifth wiring cables 40, 42, 44, 46, and 48, and the pneumatic tube 50.

A wiring/piping pattern as the characteristic feature of the present invention will be described below.

A first fixing jig 52 for fixing the bundle 24 of wiring-/piping lines extending from the controller 38 is mounted aside the base unit 12. The first fixing jig 52 is formed into a hollow shape with an open bottom portion. More specifically, the first fixing jig 52 is constituted by an upright portion 52A fixed aside the base unit 12, and standing upright substantially to the level of the second horizontal arm 16, an inclined portion 52B inclined from the upper end of the upright portion 52A toward the first vertical axis C1, and a horizontal portion 52C horizontally extending from the upper end of the inclined portion 52B to the first vertical axis C1. In other words, the distal end of the horizontal portion 52C of the first fixing jig 52 is located immediately above the center of rotation of the first horizontal arm 14, which center is defined by the first vertical axis C1. More specifically, the upper portion of the first fixing jig 52 is formed to extend above the center of rotation of the first horizontal arm 14.

The first to fifth wiring cables 40, 42, 44, 46, and 48 and the pneumatic tube 50 as the above-mentioned wiring/piping lines are bundled, as indicated by reference numeral 24, and are temporarily received by the first fixing jig 52 from an opening 53a at its bottom portion. In the first fixing jig 52, the first wiring cable 40 is disjoined from the bundle 24. The disjoined, independent first wiring cable 40 extends from the first fixing jig 52 into the base unit 12 via a communication port 53b formed in a junction portion between the first fixing jig 52 and the base unit 12, and is directly connected to the first driving motor 28.

The bundle 24 of remaining lines from which the first wiring cable 40 is disjoined is firmly fixed to the inner surface of the first fixing jig 52 via a mounting bracket 56, and extends to the upper portion in the first fixing jig 52. In the upper portion in the first fixing jig 52, the second wiring cable 42 is disjoined from the bundle 24. In this manner, the independent second wiring cable 42 disjoined from the bundle 24 is held on the lower surface of the upper portion of the first fixing jig 52, i.e., a portion opposing the center of rotation of the first horizontal arm 14 via a mounting bracket 58, and extends outside the first fixing jig 52 via an extraction port 53c formed in this portion.

A second fixing jig 60 for mounting and fixing the second wiring cable 42 to the second driving motor 30 is mounted on the first horizontal arm 14 and to be located on the first vertical axis C1 for defining the center of rotation of the first horizontal arm 14. The second fixing jig 60 receives the second wiring cable 42 independently extending from the first fixing jig 52. The second wiring cable 42 is held in the second fixing jig 60 via a mounting bracket 62. Furthermore, the second wiring cable 42 extends from the second fixing jig 60, and is connected to the second driving motor 30. A portion of the second wiring cable 42 located between the first and second jigs 52 and 60 is formed as a coil portion 42A in a spiral pattern, as shown in FIG. 9.

In this manner, since the second wiring cable 42 is formed to have the coil portion 42A between the first and second fixing jigs 52 and 60, even when the first horizontal arm 14 is rotated about the first vertical axis C1, torsion of the second wiring cable 42 caused by the rotation of the arm 14 can be reliably absorbed by the coil portion 42A, and high durability and reliability of the wiring can be maintained.

A portion of the second wiring cable 42 located between the second fixing jig 60 and the second driving motor 30 is detachably coupled via a connector 64. Since the second wiring cable 42 is formed so that the connector 64 is inserted between the second fixing jig 60 and the second driving motor 30, an extending operation of the second wiring cable 42 can be greatly facilitated.

A first pipe 66 through which the bundle 24 of wiring/piping lines from which the first and second wiring cables 40 and 42 are removed is inserted is bridged in a substantially U shape between the first fixing jig 52 and the above-mentioned third fixing jig 36. The first pipe 66 is formed of a flexible material to have flexibility. One end of the first pipe 66 is stationarily mounted on the upper surface of the upper portion of the first fixing jig 52 to be coaxial with the first vertical axis C1 via a first nut 68, and the other end thereof is rotatably mounted on an upper surface portion of the upper portion of the third fixing jig 36 near the first fixing jig 52 via a second nut 70 and a hexagon nut 72.

Figure 10:
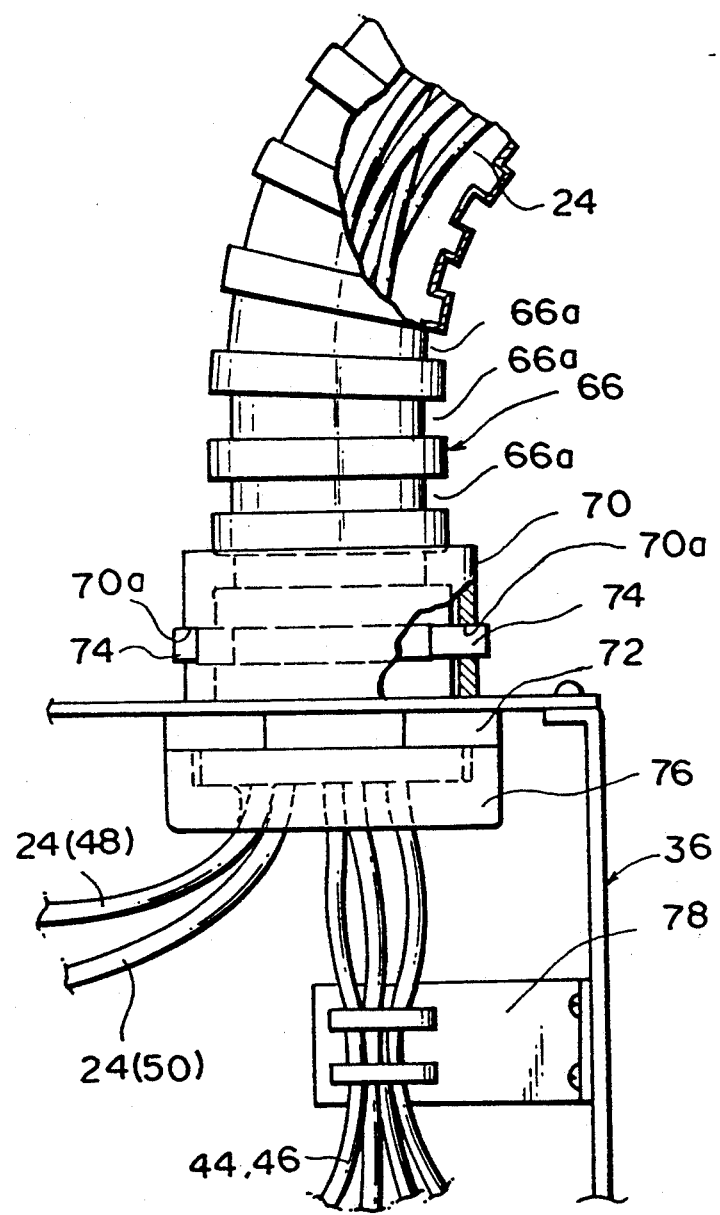
FIG. 10 is a longitudinal sectional view showing in detail a mounting state of the other end of a first pipe to a third fixing jig in the industrial robot shown in FIG. 9.

As shown in FIG. 10, a large number of outer circumferential grooves 66a extending in the circumferential direction are formed on the outer circumferential surface of the first pipe 66 along its entire length. A mounting state of the other end of the first pipe 66 to the third fixing jig 36 is as shown in FIG. 10. More specifically, the second nut 70 is formed into a cylindrical shape with upper and lower openings, and its lower end, i.e., an end portion to be inserted into the third fixing jig 36 is threaded. The other end of the first pipe 66 is inserted in the second nut 70.

A semi-circularly extending insertion groove 70a is formed on the outer circumferential surface of the second nut 70. A so-called horseshoe-shaped locking member 74 is detachably fitted in the insertion groove 70a. The two ends of the locking member 74 are respectively fitted in opposing portions in one outer circumferential groove 66a formed on the first pipe 66 which is inserted in the second nut 70. In this manner, the other end of the first pipe 66 is pivotally attached to the second nut 70.

The lower end of the second nut 70 to which the first pipe 66 is pivotally attached in this manner is received by the third fixing jig 36 via a mounting opening (not shown) which is formed in the upper surface of the third fixing jig 36 to have a size just allowing insertion of the lower end of the second nut 70. The hexagon nut 72 is threadably engaged with the lower end of the second nut 70 received by the third fixing jig 36. In this manner, the second nut 70 and the hexagon nut 72 vertically sandwich the upper surface portion of the third fixing jig 36, so that the second nut 70 is fixed to the third fixing jig 36. As a result, the other end of the first pipe 66 is connected to the third fixing jig 36 to be pivotal through the second nut 70, and is prevented from being disengaged therefrom.

Figure 11A:
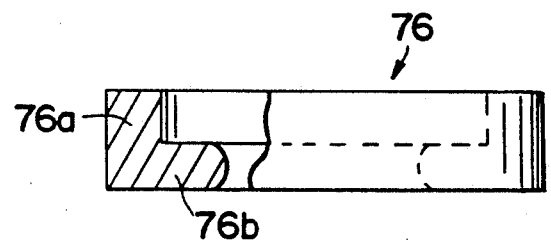
FIGS. 11(A) and 11(B) are respectively a partial longitudinal sectional view and a plan view showing a detailed shape of a protection jig shown in FIG. 10.
Figure 11B:
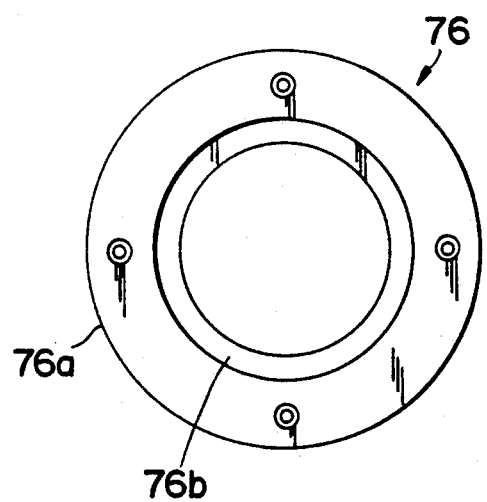

As shown in FIG. 10, a protection jig 76 for protecting the bundle 24 of wiring/piping lines is attached to the lower surface of the hexagon nut 72 via a bolt (not shown). As shown in FIGS. 11(A) and 11(B), the protection jig 76 is constituted by a cylindrical main body 76a which has substantially the same outer diameter as that of the hexagon nut 72, and has an upper opening, and an inward flange portion 76b integrally formed on the lower end of the main body 76a. An opening defined by the internal peripheral edge of the inward flange portion 76b is matched to be substantially coaxial with the opening of the other end of the first pipe 66. The internal peripheral edge of the inward flange portion 76b is formed to have roundness, i.e., a semi-circular section.

Since the protection jig 76 is arranged in this manner, even if the bundle 24 of wiring/piping lines extending from the other end of the first pipe 66 into the third fixing jig 36 via the lower end of the second nut 70 is twisted upon pivotal movement of the first and second horizontal arms 14 and 16, these lines are only in sliding contact with the round inner peripheral edge of the protection jig 76, and can be prevented from being in sliding contact with the inner circumferential surface of the exit at the lower end of the second nut 70. As a result, the bundle 24 of wiring/piping lines can be reliably prevented from being disconnected by wear upon sliding contact with the inner circumferential surface of the exit at the lower end of the second nut 70.

Although not shown, grease as a lubricant is applied to a pivotal coupling portion between the other end of the first pipe 66 and the second nut 70. In this manner, when the other end of the first pipe 66 is rotated relative to the second nut 70 upon pivotal movement of the first and second horizontal arms 14 and 16, a relative sliding state occurs therebetween. In this case, wear caused by sliding contact can be effectively prevented since the grease is applied.

As described above, the other end of the first pipe 66 is rotatably mounted in an upper surface portion of the upper portion of the third fixing jig 36 near the first fixing jig 52. In other words, the other end of the first pipe 66 is connected to the upper surface portion of the third fixing jig 36 near the second vertical axis C2, i.e., to substantially the rotational central position. As a result, even when the first and second horizontal arms 14 and 16 are pivoted in the horizontal plane, a change in distance between the two ends of the first pipe 66, i.e., a change in distance between the nuts 68 and 70 can be decreased, and the change in distance can be almost negligible.

Therefore, in this embodiment, even when the first and second horizontal arms 14 and 16 are pivoted, no excessive load acts on the first and second nuts 68 and 70 for connecting the two ends of the first pipe 66 to the first and third fixing jigs 52 and 36, and the service life of the first pipe 66 and the first and second nuts 68 and 70 can be prevented from being shortened.

In the first fixing jig 52, as described above, since the upright portion 52A and the horizontal portion 52C are coupled via the inclined portion 52B, the bundle 24 of wiring/piping lines smoothly passes through the first fixing jig 52, passes through the U-shaped first pipe 66, and is then received by the third fixing jig 36 via the second nut 70. In this manner, the bundle 24 of wiring/piping lines extends substantially vertically downward from the second nut 70, and even when the first and second horizontal arms 14 and 16 are pivoted, torsion of the bundle 24 can be satisfactorily absorbed by the inclined portion 52B, and the bundle 24 can be free from torsion at the exit of the second nut 70. Therefore, the bundle 24 can be effectively suppressed from being in sliding contact with the second nut 70 and the protection jig 76. As a result, the bundle 24 of wiring/piping lines is not easily in sliding contact with even the round sliding surface of the above-mentioned protection jig 76, and the service life of the bundle 24 can be prevented from being shortened due to wear, thereby guaranteeing long service life.

The bundle 24 of wiring/piping lines passing through the first pipe 66 is applied with a lubricant. As a result, a local load which is generated when the bundle 24 of wiring/piping lines is twisted and is brought into sliding contact with the inner wall of the first pipe 66 which is deformed upon pivotal movement of the first and second horizontal arms 14 and 16 about the first and second vertical axes C1 and C2, respectively, can be effectively reduced.

The bundle 24 of wiring/piping lines passing through the first pipe 66 extends into the third fixing jig 36. The third and fourth wiring cables 44 and 46 are disjoined from the bundle 24 here. The independent third and fourth wiring cables 44 and 46 disjoined from the bundle 24 are held on the inner wall of the third fixing jig 36 via a mounting bracket 78, and are respectively connected to the third and fourth driving motors 32 and 34. Note that portions of the third and fourth wiring cables 44 and 46 located between the mounting bracket 78 and the third and fourth driving motors 32 and 34 are detachably coupled via connectors 80 and 82.

A fourth fixing jig 84 for mounting and fixing the bundle 24 of wiring/piping lines extending to the hand mechanism 20 is attached to the upper end of the vertical arm 18 described above. A second pipe 86 through which the bundle 24 of wiring/piping lines from which the first to fourth wiring cables 40, 42, 44, and 46 are disjoined is inserted is bridged in a substantially U shape between the fourth fixing jig 84 and the above-mentioned third fixing jig 36. The second pipe 86 is formed of a flexible material to have flexibility. One end of the second pipe 86 is attached to an upper surface portion of the upper portion of the third fixing jig 36 near the vertical arm 18 via a third nut 88, and the other end thereof is attached to the upper surface of the fourth fixing jig 84 via a fourth nut 90.

The fifth wiring cable 48 and the piping (pneumatic) tube 50 constituting the bundle 24 of wiring/piping lines received by the fourth fixing jig 84 are mounted on the inner wall of the fourth fixing jig 84 via a mounting bracket 92, pass through the hollow vertical arm 18, and are then connected to the hand mechanism 20 via the hand attaching/detaching mechanism 22. The fifth wiring cable 48 and the piping tube 50 are detachably coupled via a pair of connectors 94 and 96 in the fourth fixing jig 84, and are also detachably coupled in the hand attaching/detaching mechanism 22, as will be described later.

Since the fifth wiring cable 48 and the piping tube 50 are detachably coupled in the fourth fixing jig 84 and the hand attaching/detaching mechanism 22, an attaching/detaching operation of the hand mechanism 20 can be facilitated, and an operation for exchanging the second pipe 86 due to disconnection of a wiring/piping line can also be facilitated. Since the bundle 24 of wiring/piping lines is fixed in the fourth fixing jig 84 while being bundled by the mounting bracket 92, torsion of the bundle 24 of wiring/piping lines upon pivotal movement of the vertical arm 18 about the third vertical axis C3 can be absorbed in the second pipe 86 over a long distance.

A lubricant is also applied to the bundle 24 of wiring/piping lines passing through the second pipe 86 like in the first pipe 66. As a result, a local load which is generated when the bundle 24 of wiring/piping lines is twisted, and is brought into sliding contact with the inner wall of the second pipe 86 which is deformed upon pivotal movement of the vertical arm 18 about the third vertical axis C3 or vertical movement of the vertical arm 18 along the third vertical axis C3, can be effectively reduced.

The fifth wiring cable 48 constituting the bundle 24 of wiring/piping lines comprises a cable which is obtained by bundling a plurality of coated lines, and coating the entire bundle with a shield. In this embodiment, the shield portion corresponding to the fifth wiring cable 48 inserted in the second pipe 86 is locally cut, and some lines are extracted therefrom.

As a result, in an operation for inserting the fifth wiring cable 48 in the second pipe 86, the rigidity of the cable itself is weakened, and the insertion operation is facilitated. In addition, a portion of the fifth wiring cable 48, which portion is inserted in the second pipe 86, can effectively absorb torsion caused by pivotal movement of the vertical arm 18 about the third vertical axis C3 or vertical movement of the vertical arm 18 along the third vertical axis C3.

The structure of the hand attaching/detaching mechanism 22 as the characteristic feature of the present invention will be described in detail below with reference to FIGS. 12 to 21.

Holder

Figure 12:
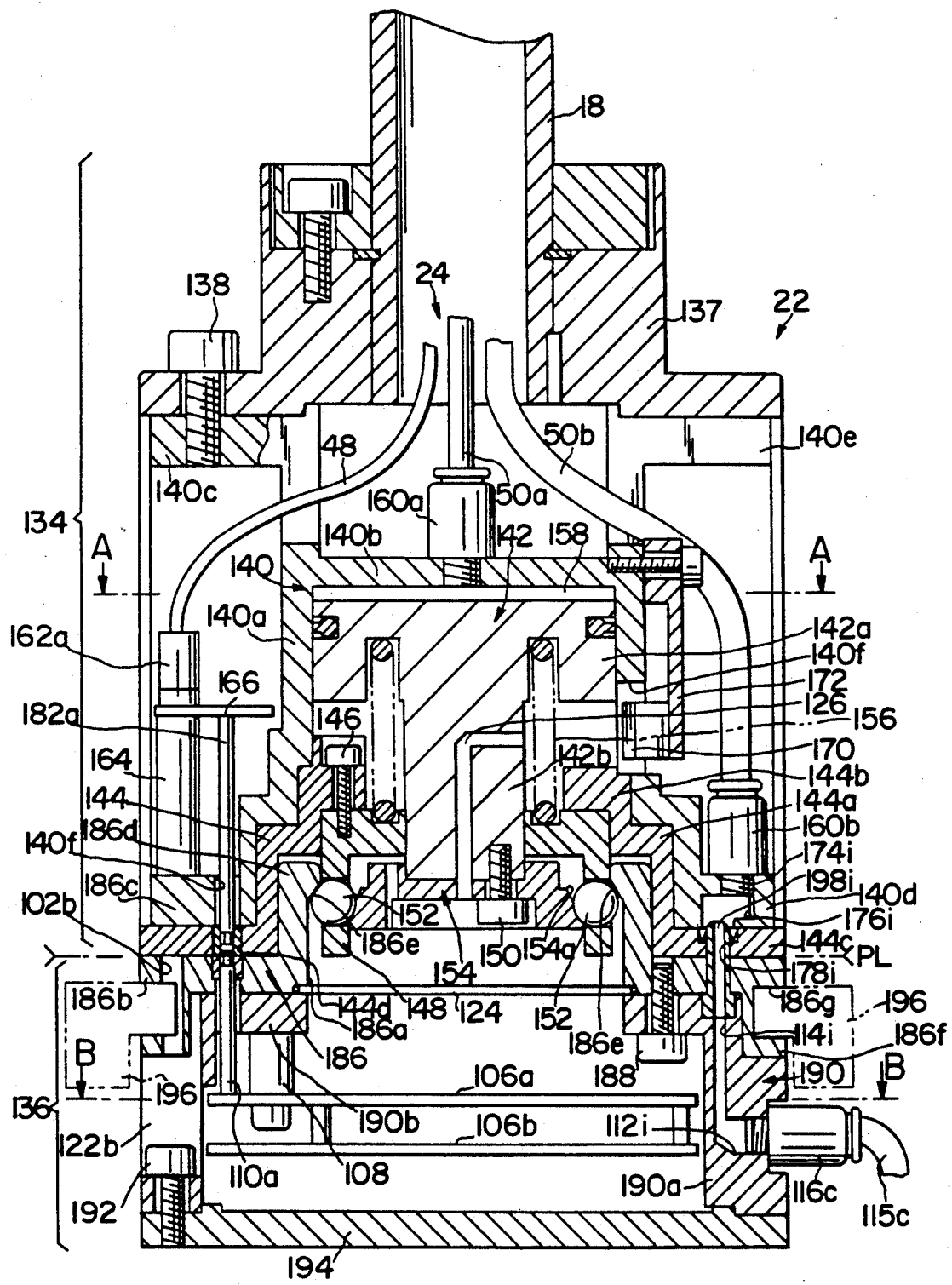
FIG. 12 is a longitudinal sectional view showing a coupled state of a hand attaching/detaching mechanism shown in FIG. 9.

The hand attaching/detaching mechanism 22 is arranged to detachably attach the hand mechanism 20 to the lower end of the vertical arm 18 of the industrial robot 10, and basically comprises a holder 134 fixed to the distal end of the vertical arm 18, and a shank 136 which can be desirably engaged/disengaged with/from the holder 134, and to the lower portion of which the hand mechanism 20 is fixed, as shown in FIG. 12.

As shown in FIG. 12, the holder 134 is constituted by a fixing portion 137 fixed to the outer circumferential surface of the lower end portion of the vertical arm 18, a cylinder portion 140 mounted on the lower surface of the fixing portion 137 via bolts 138, a piston 142 which is stored in the cylinder portion 140 to be vertically slidable, an inner cylinder 144 integrally fitted in the lower end face and the inner circumferential surface of the lower portion of the cylinder portion 140, a ball support cylinder 148 fixed in the inner cylinder 144 via bolts 146, a locking member 154 which is fixed to the lower end of the piston 142 via bolts 150, and is formed with an outward tapered surface 154a on its outer circumferential surface, which surface 154a is engaged from below with inner lower portions of a plurality of balls 152 supported by the ball support cylinder 148, and a coil spring 156, interposed between the ball support cylinder 148 and the piston 142, for normally biasing the piston 142 upward.

Figure 13:
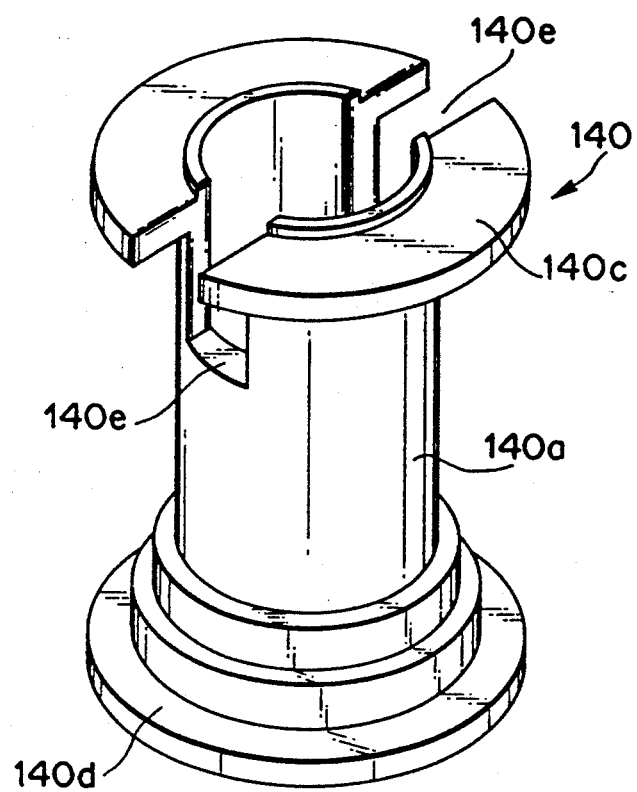
FIG. 13 is a perspective view of a cylinder body.

As shown in detail in FIG. 13, the cylinder portion 140 is integrally formed by a cylinder main body 140a formed into a substantially hollow cylindrical shape with upper and lower openings, a partition wall 140b (FIG. 12) for partitioning the internal space of the cylinder main body 140a into upper and lower portions, a first outward flange portion 140c formed on the outer circumferential surface of the upper end portion of the cylinder main body 140a, and a second outward flange portion 140d formed on the outer circumferential surface of the lower end portion of the cylinder main body 140a.

Wide slits 140e vertically extend along the central line in a portion above the partition wall 140b of the cylinder main body 140a to extend over the first outward flange portion 140c. Since the slits 140e are formed in this manner, the bundle 24 of wiring/piping lines passing through the vertical arm 18 extends from the lower end opening of the vertical arm 18 into the internal space above the partition wall 140b of the cylinder portion 140, and then extends outside the cylinder portion 140 via the slits 140e, as shown in FIG. 12.

As shown in FIG. 12, the bundle 24 of wiring/piping lines passing through the vertical arm 18 is constituted by the fifth wiring cable 48 and the piping tube 50, as described above. The piping tube 50 is divided into a first air hose 50a for introducing compressed air into a cylinder chamber 158 (to be described later), and nine second air hoses 50b (only one is illustrated for the sake of simplicity) for supplying compressed air to the hand mechanism 20 when the tube 50 extends from the lower end of the vertical arm 18 into the hand detaching/attaching mechanism 22. The first air hose 50a is connected to the central portion of the partition wall 140b via a first connection port 160a, and the nine second air hoses 50b are connected to the upper surface of the second outward flange portion 140d via corresponding second connection ports 160b. The fifth wiring cable 48 is electrically connected, via a first connector 162a connected to its distal end, to a junction circuit board 166 mounted on the second outward flange portion 140d via a stay 164.

The above-mentioned cylinder chamber 158 is defined by a space surrounded by the lower surface of the partition wall 140b, the upper surface of the piston 142, and the inner circumferential surface of the main body 140a. The piston 142 is integrally formed by a piston main body 142a which is in sliding contact with the inner circumferential surface of the cylinder main body 140a, and a solid columnar projecting portion 142b which projects downward from the central portion of the lower surface of the piston main body 142a.

The piston 142 having the above-mentioned structure is elastically held at the uppermost position where the piston 142 is in contact with a stopper (not shown) by the biasing force of the coil spring 156 when no compressed air is introduced into the cylinder chamber 158. When compressed air is introduced into the cylinder chamber 158 via the first connection port 160a, the piston 142 is moved downward against the biasing force of the coil spring 156, and is brought into contact with the upper end of the above-mentioned inner cylinder 144. Thus, the piston 142 is held at its lowermost position.

The above-mentioned inner cylinder 144 is integrally formed by an inner cylinder main body 144a fitted in the inner circumferential surface of the lower portion of the cylinder main body 140a, and having a substantially hollow cylindrical shape with upper and lower openings, an inward flange portion 144b formed on the upper end of the inner cylinder main body 144a, and an outward flange portion 144c which is formed on the lower end of the inner cylinder main body 144a, and is in contact with the lower surface of the second outward flange portion 140d. Note that the lower surface of the outward flange portion 144c defines the upper side of an attaching/detaching plane PL. More specifically, the above-mentioned shank 136 is defined in a portion below the lower surface of the outward flange portion 144c.

The above-mentioned ball support cylinder 148 is formed into a cylindrical shape with an open lower surface. More specifically, as shown in detail in FIG. 14, the ball support cylinder 148 is integrally formed by a hollow cylindrical support cylinder main body 148a fitted in the upper portion of the inner cylinder main body 144a, and a ceiling portion 148b formed to cover the upper surface of the support cylinder main body 148a. An insertion hole 148c through which the projecting portion 142b of the piston 142 described above is vertically movably inserted is formed in the central portion of the ceiling portion 148b. The thickness of the support cylinder main body 148a is smaller than the diameter of each ball 152 supported by it.

Note that the ball support cylinder 148 is formed with a plurality of (six in this embodiment) ball support holes 148d which extend through the support cylinder main body 148a in the direction of thickness, and are arranged at equal angular intervals in the circumferential direction. Each ball support hole 148d has a circular shape when viewed from the front side, and has a diameter slightly larger than the diameter of the ball 152, so that the ball 152 can be inserted and moved in the hole 148d. That is, at least one (inner and/or outer) side of each ball 152 projects from the corresponding ball support hole 148d.

A locking sleeve 168 is fitted on the outer circumferential surface of the support cylinder main body 148a so as to lock the balls 152 from being dropped radially outwardly from the corresponding ball support holes 148d. The locking sleeve 168 is aligned and fixed such that its lower end slightly extends downward from the upper edge of each ball support hole 148d and constitutes a locking pawl. More specifically, a tapered surface 168a directed downward toward a radially outward direction is formed on the lower end of the locking sleeve 168, and extends to the upper portions of the corresponding ball support holes 148d. In this manner, the balls 152 are locked by the tapered surface 168a of the locking sleeve 168, and can be prevented from being dropped radially outwardly from the corresponding ball support holes 148d.

Referring again to FIG. 12, the above-mentioned locking member 154 is constituted by a substantially disk-shaped main body portion 154b fixed to the lower end of the projecting portion 142b which projects to the internal space of the ball support cylinder 148 via the insertion hole 148c, and an outward flange portion 154c formed on the lower end of the main body portion 154b, and having an outer circumferential surface which is in sliding contact with the inner circumferential surface of the support cylinder main body 148a. The above-mentioned outward tapered surface 154a is defined between the upper edge of the outward flange portion 154c, and the lower edge of the main body portion 154b. The outward tapered surface 154a is inclined so as to increase in diameter towards its lower end.

A gap between the inner circumferential surface of the support cylinder main body 148a of the ball support cylinder 148 and the outer circumferential surface of the main body portion 154b of the locking member 154 is set to be small enough to prevent the balls 152 from being disengaged inwardly. In this manner, the balls 152 are supported in the ball support holes 148d of the ball support cylinder 148 while being prevented from being disengaged outwardly and inwardly. In particular, the diameter of the outer circumferential surface of the main body portion 154b is set to be large enough to completely receive the radially outward end of each ball 152 in the corresponding ball support hole 148d when the ball 152 is displaced radially inwardly, as indicated by an alternate long and two short dashed line in FIG. 14.

Figure 14:
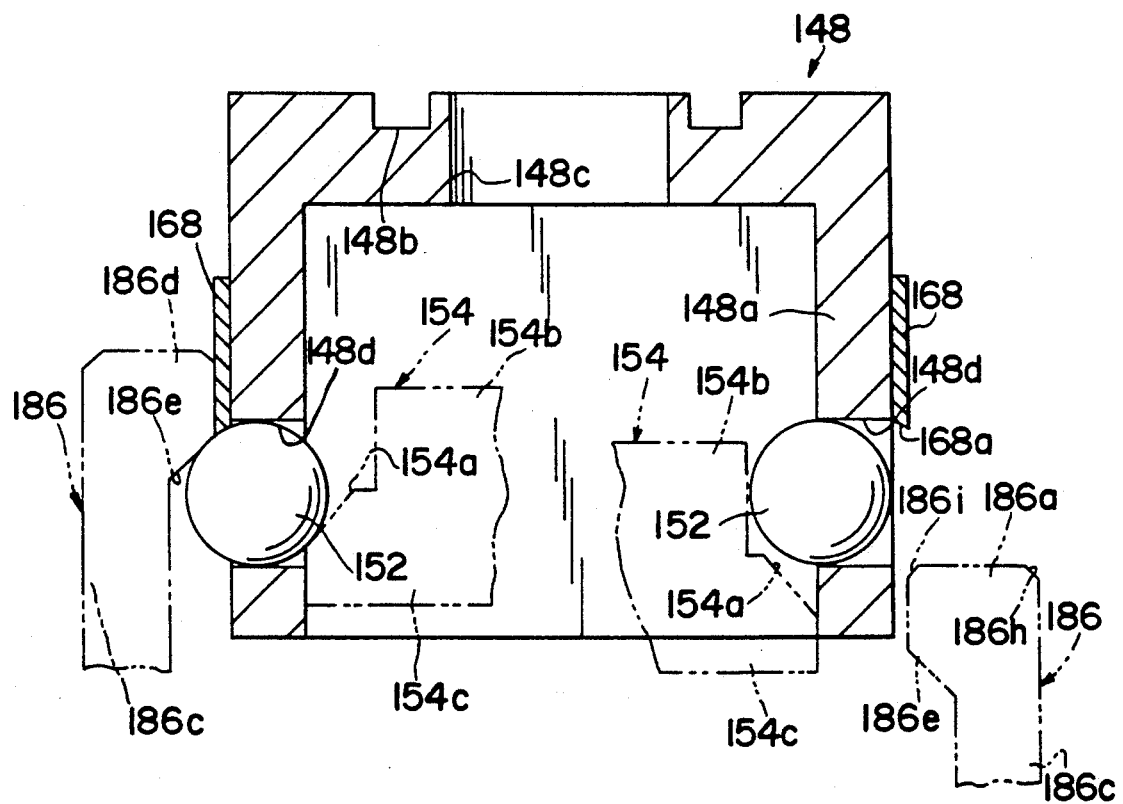
FIG. 14 is a longitudinal sectional view of a ball support cylinder.

In a state wherein the piston 142 is located at the uppermost position, the outward tapered surface 154a is in contact with the inside portions of the corresponding balls 152 to displace these balls 152 radially outwardly, so that the outside portions of the balls 152 project outwardly from the outer circumferential surface of the support cylinder main body 148a, as indicated by an alternate long and short dashed line in FIG. 14. In a state wherein the piston 142 is located at the lowermost position, the outward tapered surface 154a is disengaged from the inside portions of the corresponding balls 152, and allows radially inward movement of these balls 152, so that the outside portions of the balls 152 are prevented from projecting from the outer circumferential surface of the support cylinder main body 148a, as indicated by an alternate long and two short dashed line in FIG. 14.

Figure 15:
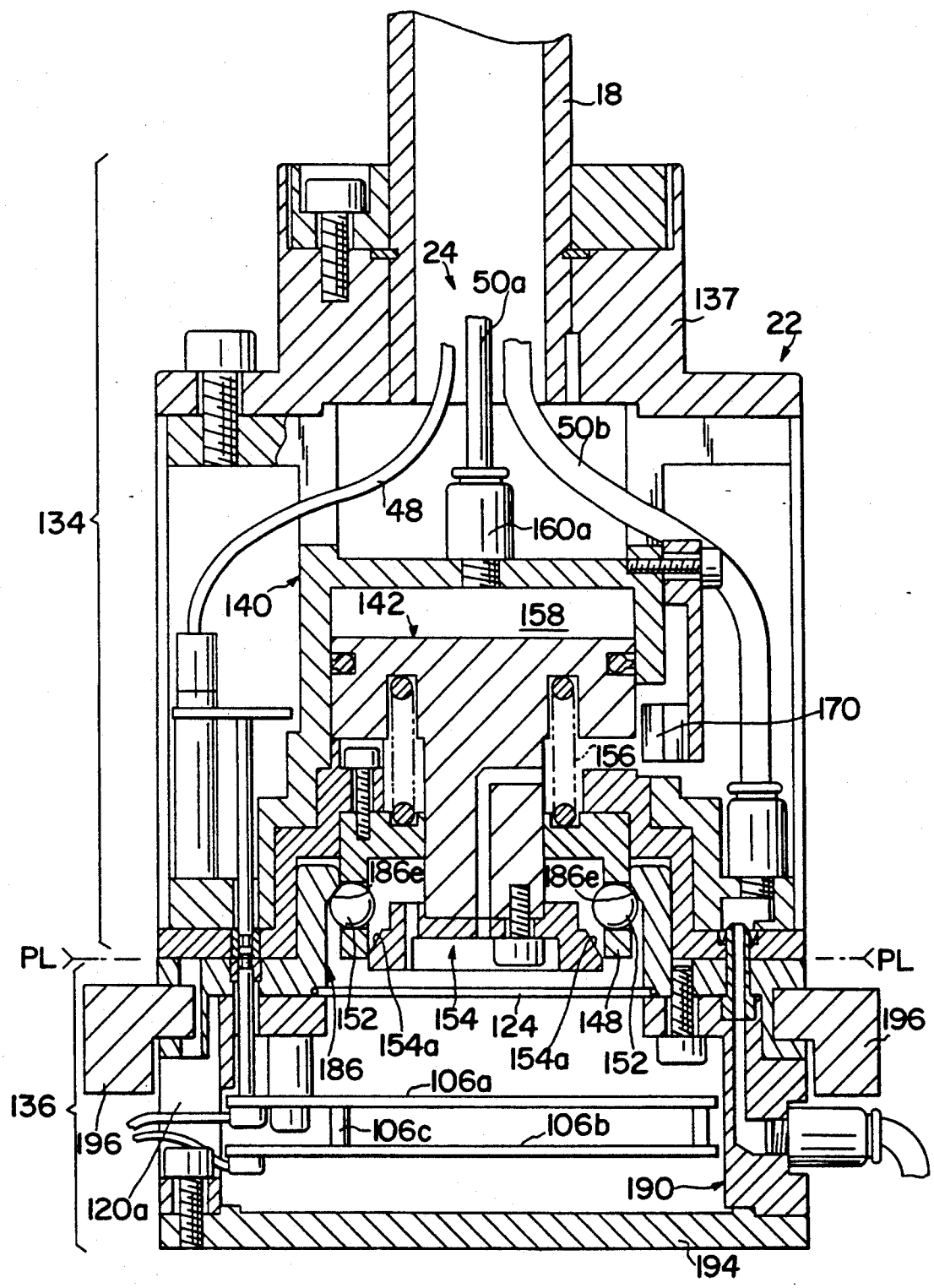
FIG. 15 is a longitudinal sectional view showing the hand attaching/detaching mechanism in a state wherein an open state of a holder is defined.

More specifically, as shown in FIG. 15, when the piston 142 is moved downward to its lowermost position, an open state of the hand attaching/detaching mechanism 22 is defined. In order to detect the lowermost position of the piston 142, an opening 140f is formed substantially at the middle position of the cylinder main body 140a of the cylinder portion 140, which position faces the lower end of the piston main body 142a at the lowermost position. A lowermost position check sensor 170 is mounted on the cylinder main body 140a via a stay 172 to be located in the opening 140f. The lowermost position check sensor 170 is turned on by the piston main body 142a which is moved downward to its lowermost position, and is turned off when the piston main body 142a is located at a position other than the lowermost position.

Attaching/Detaching Portion

As shown in FIG. 16, a total of nine connection holes 174a to 174i are formed on a substantially right half portion (FIG. 16) of the upper surface of the second outward flange portion 140d of the cylinder portion 140 These connection holes 174a to 174i are connected to the second connection ports 160b. In this embodiment, as described above, three second connection ports 160b are arranged in correspondence with three second air hoses 50b, and the first, fifth, and ninth connection holes 174a, 174e, and 174i are used in accordance with compressed air supply positions of the hand mechanism 20 (to be described later).

In FIG. 12, only the ninth connection port 174i is illustrated for the sake of convenience. Communication chambers 176a to 176i are formed in the lower surface of the second outward flange portion 140d to communicate with the connection ports 174a to 174i, respectively.

The communication chambers 176a to 176i are closed by the outward flange portion 144c of the inner cylinder 144 attached to the lower surface of the second outward flange portion 140d of the cylinder portion 140. Nine connection pipe insertion holes 178a to 178i through which connection pipes 198a to 198i (to be described later) are formed in the outward flange portion 144c to be open to the radially inward portions of the communication chambers 176a to 176i and to extend through the outward flange portion 144c in the direction of thickness.

Referring again to FIG. 16, a plurality of (15 in this embodiment) connection pins 180a to 180o are fixed in an upright state to the above-mentioned junction circuit board 166. Note that the connection pins 180a to 180o are mounted to be connected to the first connector 162a described above.

The reason why 15 connection pins 180a to 180o are arranged is that the fifth wiring cable 48 is constituted as a serial interface cable, and a communication is performed between the robot controller 38 and the hand mechanism 20 through this cable.

The connection pins 180a to 180o on the junction circuit board 166 are electrically connected to connection bushings 184a to 184o formed on the lower surface of the outward flange portion 144c of the inner cylinder 144 via connection rods 182a to 182o, respectively. More specifically, vertically extending through holes 144d for receiving the connection bushings 184a to 184o are formed in the outward flange portion 144c, and connection terminals (to be described later) are inserted in the internal spaces of the connection bushings 184a to 184o to attain electrical connections.

The connection rods 182a to 182o are fitted in the upper portions of the corresponding connection bushings 184a to 184o via through holes 140f vertically extending through the second outward flange portion 140d so as to attain electrical connections. In this manner, the connection pins 180a to 180o are electrically connected to the connection bushings 184a to 184o.

The description of the holder 134 for defining one constituting element of the hand attaching/detaching mechanism is finished. The shank 136 for defining the other constituting element of the hand attaching/detaching mechanism 22 will be described below.

Shank

The shank 136 has a structure common to various hand mechanisms detachably attached to the vertical arm 18 of the industrial robot 10 via the hand attaching/detaching mechanism 22. As shown in FIG. 12, the shank 136 is mainly constituted by a shank main body 186 whose upper surface defines the lower side of the attaching/detaching plane PL, a coupling cylinder 190 fixed to the lower portion of the shank main body 186 via bolts 188, and a mounting plate 194 fixed to the lower surface of the coupling cylinder 190 via bolts 192.

The shank main body 186 comprises, at its central portion, a disk-like attaching/detaching member 186b formed with a circular through hole 186a in which the ball support cylinder 148 of the holder 134 is loosely fitted. A cylindrical locking cylinder portion 186c serving as a positioning boss portion is integrally formed on the upper surface of the attaching/detaching member 186b so as to surround the through hole 186a and to stand upright from the circumferential edge of the opening. An inward flange portion 186d is formed on the upper end of the locking cylinder portion 186c. A hooking inward tapered surface 186e capable of hooking the outside upper portions of the balls 152 supported on the above-mentioned ball support cylinder 148 is formed at the lower edge of the inner circumferential surface of the inward flange portion 186d.

The hooking inward tapered surface 186e is inclined to increase in diameter toward its upper end. The inner circumferential surface of the inward flange portion 186d opposes the outer circumferential surface of the above-mentioned locking sleeve 168 to have a small gap therebetween.

A downward projecting portion 186f having a predetermined thickness is integrally formed on the lower surface of the outer peripheral portion of the attaching/detaching member 186b of the shank main body 186 over the entire periphery. A locking groove 186g to be locked with a hand base (FIG. 19; or shank holder) 196 is formed on the outer circumferential surface of the downward projecting portion 186f over the entire circumference.

Figure 19:
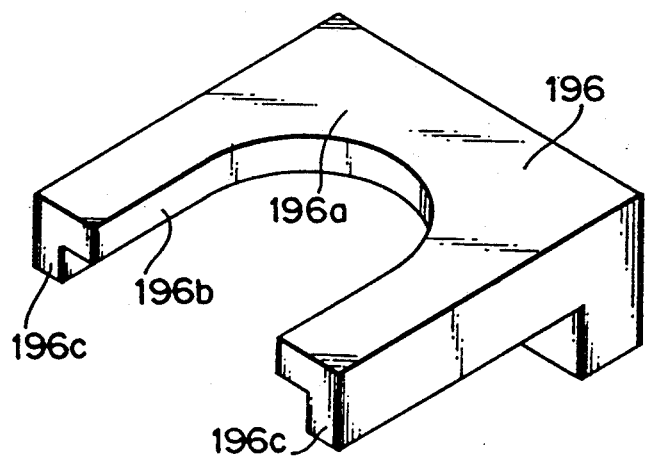
FIG. 19 is a perspective view showing a structure of a shank rack.

As shown in FIG. 19, a plurality of hand bases 196 are arranged in a hand exchange station (not shown), and have the same shape. Each hand base 196 comprises a planar rack main body 196a having a thickness to be fitted in the locking groove 186g of the shank 136, as shown in FIG. 19. A recess portion 196b for nearly entirely receiving the shank 136 is formed in the front end face of the rack main body 196a.

As shown in the enlarged view of FIG. 14, in the shank main body 186 with the above structure, an outward tapered surface 186h is formed on the entire outer circumferential edge of the upper surface of the inward flange portion 186d, so that the inward flange portion 186d of the shank main body 186 can be easily brought into sliding contact with and fitted in the inner circumferential surface of the inner cylinder main body 144a of the inner cylinder 144 when the holder 134 is moved downward toward the shank 136 locked by the shank holder 196.

An insertion inward tapered surface 186i is formed on the entire inner circumferential edge of the upper surface of the inner flange portion 186d, so that the inner circumferential surface of the inward flange portion 186d of the shank main body 186 can be reliably brought into sliding contact with and fitted on the outer circumferential surface of the locking sleeve 168 when the holder 134 is further moved downward after the shank main body 186 is fitted in the inner cylinder 144.

As shown in FIG. 17, upward projecting connection pipes 198a to 198i are arranged on the upper surface of the shank main body 186 at positions corresponding to the connection pipe insertion holes 178a to 178i, so that they can be inserted in the holes 178a to 178i from below, respectively. When the holder 134 is moved downward, and the holder 134 and the shank 136 are coupled to each other, i.e., when the lower surface of the outward flange portion 144c of the inner cylinder 144 is brought into contact with the upper surface of the attaching/detaching member 186b of the shank main body 186, the upper ends of the connection pipes 198a to 198i are inserted into the communication chambers 176a to 176*i* via the corresponding connection pipe insertion holes 178*a* to 178*i*, respectively.

As shown in FIG. 17, upward projecting connection terminals 100*a* to 100*o* are arranged on the upper surface of the shank main body 186 at positions corresponding to the above-mentioned connection bushings 184*a* to 184*o*, so that they can be inserted in the bushings 184*a* to 184*o* from below, respectively. When the holder 134 is moved downward, and the holder 134 is coupled to the shank 136, the upper ends of the connection terminals 100*a* to 100*o* are inserted in the corresponding connection bushings 184*a* to 184*o*, and are electrically connected thereto.

Furthermore, as shown in FIG. 17, four through-holes 102*a* to 102*d* for fixing a mounting plate 194 to a coupling cylinder 190 by pivoting bolts 192 from the above are formed in the upper surface of the shank main body 186 at equal angular intervals along the circumferential direction to extend through the main body 186 in the direction of thickness.

Figure 20:
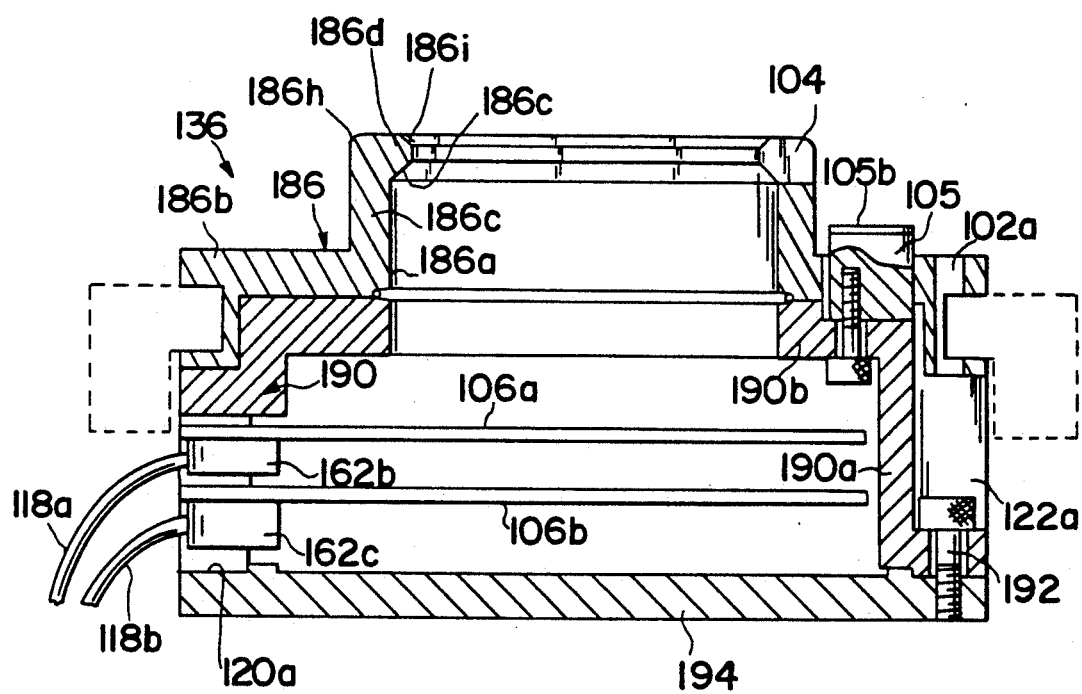
FIG. 20 is a front sectional view showing a formation state of a measurement slit formed in the shank main body.

As shown in FIGS. 17 and 20, a downward extending measurement slit 104 is formed in the upper surface of the inward flange portion 186*c* of the shank main body 186. As can be seen from FIG. 20, the lower end of the slit 104 is terminated at a position immediately below the lower edge of the hooking inward tapered surface 186*e*. Since the slit 104 is formed in this manner, when the hooking inward tapered surface 186*e* is actually formed by machining, the tapered surface can be formed while being observed through the slit 104. More specifically, as will be described in detail later, the hooking inward tapered surface 186*e* can be formed while detecting its formation position by a detection device utilizing visual sensation.

As a result, the shape and size of the hooking inward tapered surface 186*e* can be accurately defined. In this manner, the six balls 152 can be clamped between the tapered surface 186*e* and the outward tapered surface 154*a* in a state wherein these surfaces are precisely positioned, as shown in FIG. 12. Therefore, according to this embodiment, when a coupled state is defined in the hand attaching/detaching mechanism 22, the lower surface of the outward flange portion 144*c* of the inner cylinder 144 on the holder 134 side, and the upper surface of the shank main body 186 on the shank 136 side are set in a tight contact state at the attaching/detaching plane PL. Thus, a good coupled state free from cluttering can be attained.

The coupling cylinder 190 constituting the shank 136 is integrally formed by a main body portion 190*a* formed into a cylindrical shape with upper and lower openings, and an inward flange portion 190*b* formed on the upper end of the main body portion 190*a*. A pair of upper and lower circuit boards 106*a* and 106*b* are arranged in the coupling cylinder 190 so as to be suspended from the lower surface of the inward flange portion 190*b* via a spacer 108. The upper circuit board 106*a* and the above-mentioned connection terminals 100*a* to 100*o* are electrically connected to each other via connection rods 110*a* to 110*o* which vertically extend through the attaching/detaching member 186*b* of the shank main body 186 and the inward flange portion 190*b* of the coupling cylinder 190. Note that the upper and lower circuit boards 106*a* and 106*b* are electrically connected to each other through a connection circuit board 106*c*.

Figure 18:
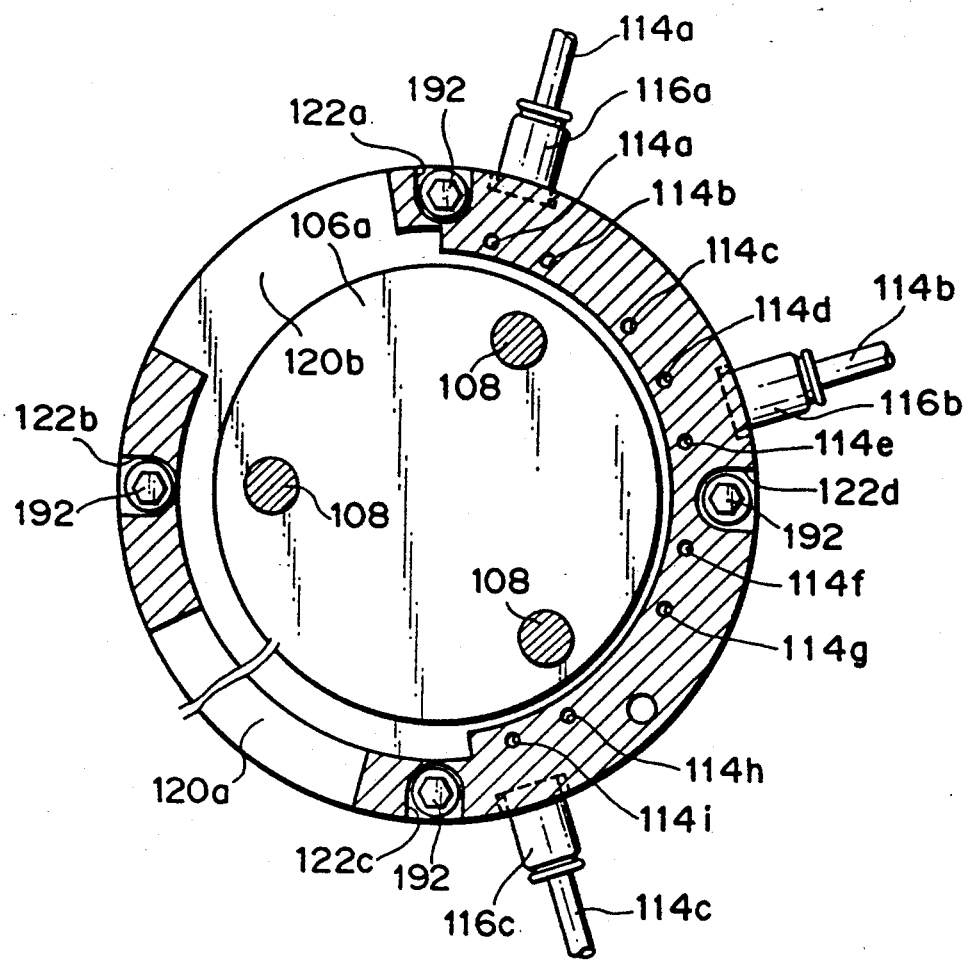
FIG. 18 is a cross-sectional view of the hand attaching/detaching mechanism taken along line B—B in FIG. 12.

Nine connection port connection holes 112*a* to 112*i* are open to the outer circumferential surface of the main body portion 190*a* of the coupling cylinder 190 in correspondence with the above-mentioned nine connection pipes 198*a* to 198*i*, respectively. The connection holes 112*a* to 112*i* communicate with the connection pipes 198*a* to 198*i* via communication paths 114*a* to 114*i* which vertically extend through the attaching/detaching member 186*b* of the shank main body 186 and the inward flange portion 190*b* of the coupling cylinder 190. Of the nine connection holes 112*a* to 112*i*, the connection holes 112*a*, 112*e*, and 112*i* corresponding to the first, fifth, and ninth connection bushings 174*a*, 174*e*, and 174*i* are connected to three connection hoses 115*a*, 115*b*, and 115*c* via connection ports 116*a*, 116*b*, and 116*c*, respectively, as shown in FIG. 18. These three connection hoses 115*a* to 115*c* extend to the hand mechanism 20.

As shown in FIG. 12, circuits for converting a serial signal sent from the robot controller 38 into a parallel signal, and for converting a parallel signal to be supplied to the robot controller 38 into a serial signal are arranged on the pair of upper and lower circuit boards 106*a* and 106*b*. Signals from the two circuit boards 106*a* and 106*b* are connected to the hand mechanism 20 via first and second connection line groups 118*a* and 118*b* (constituting the fifth wiring cable 48) respectively having second and third connectors 162*b* and 162*c* at their one-end portions, as shown in FIG. 20.

In order to temporarily extract the first and second connection line groups 118*a* and 118*b* outside the coupling cylinder 190, as shown in FIG. 18, a pair of openings 120*a* and 120*b* are formed on the circumferential wall constituting the main body portion 190*a* so as to extend through the wall in the direction of thickness. Since the openings 120*a* and 120*b* are formed in this manner, the above-mentioned first and second connection line groups 118*a* and 118*b* extend outside the shank 136 via these openings 120*a* and 120*b*, and are then connected to the hand mechanism 20.

A total of four bolts 192 described above are arranged. In order to mount these four bolts 192, four recess portions 122*a* to 122*d* are formed on the outer circumferential surfaces of the main body portion 190*a* of the coupling cylinder 190 so as to be located immediately below the above-mentioned through holes 102*a* to 102*d* and to communicate with these holes. The height of each of the recess portions 122*a* to 122*d* is set to be slightly larger than the height of each bolt 192. With this structure, after the bolts 192 are temporarily stored in the corresponding recess portions 112*a* to 112*d* sideways, these bolts are rotated by a screwdriver (not shown) inserted from the above via the corresponding through holes 102*a* to 102*d*, and are threadably engaged with the mounting plate 194. In this manner, the mounting plate 194 can be fixed to the coupling cylinder 190.

Figure 21:
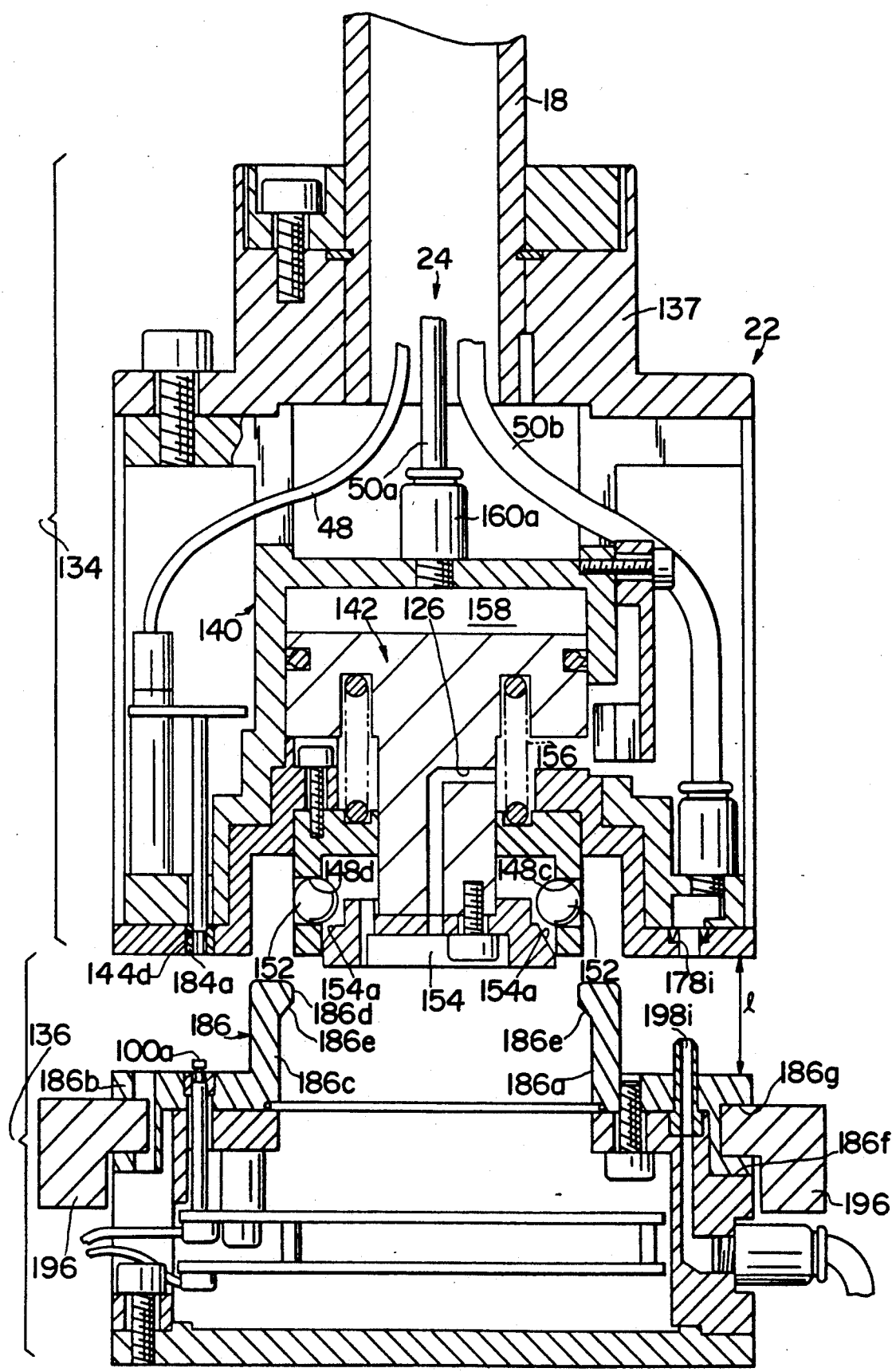
FIG. 21 is a longitudinal sectional view of the hand attaching/detaching mechanism in a state wherein the holder is completely disengaged upward from the shank.

As shown in FIG. 12, the internal space of the shank 136 is partitioned into upper and lower portions by a partition plate 124 arranged to be clamped between the shank main body 186 and the coupling cylinder 190. With this partition plate 124, as shown in FIG. 21, when the shank 136 is disengaged from the holder 134, and is held on the hand base 196 shown in FIG. 19, i.e., when the shank 136 is exposed outside, the circuit boards 106*a* and 106*b* can be still located in the closed space, and an anti-dust effect for these circuit boards 106*a* and 106*b* can be attained.

Since the partition plate 124 is arranged in this manner, as can be seen from FIG. 12, when the shank 136 is coupled to the holder 134, the volume of a space where the lower portion of the piston 142 is located, i.e., a space surrounded by the partition plate 124, the shank main body 186, and the ball support cylinder 148 is limited to be small. In an attaching/detaching operation to be described later, if the above-mentioned space is closed upon downward movement of the piston 142, the lower portion of the piston 142 projects into the closed space, and air in the closed space is compressed, thus exhibiting a so-called elastic effect. As a result, the compressed air acts as a counterforce against the downward movement of the piston 142.

However, in this embodiment, in order to prevent generation of an unnecessary counterforce against the downward movement of the piston 142, and to attain smooth downward movement of the piston 142, a communication hole 126 is formed to extend through the piston main body 142a of the piston 142, and the main body portion 154b of the locking member 154. The upper end of the communication hole 126 is open to the outer circumferential surface of the piston main body 142a which is always located above the ball support cylinder 148, and the lower end thereof is open to the lower surface of the main body portion 154b of the locking member 154.

Since the communication hole 126 is formed in this manner, according to this embodiment, even when the piston 142 is vertically moved, the above-mentioned space communicates with the outside via the communication hole 126. Therefore, the air in the space will not exhibit an elastic force, and the smooth downward movement of the piston 142 can be attained.

As many apparently widely different embodiments of the present invention can be made without departing from the spirit and scope thereof, it is to be understood that the invention is not limited to the specific embodiments thereof except as defined in the appended claims.

What is claimed is:

1. An industrial robot, comprising:
    a base unit;
    a first arm having opposite end portions, one end portion is attached to said base unit to be rotatable about a first axis;
    a second arm having opposite end portions, one end portion is attached to the other end portion of said first arm to be rotatable about a second axis;
    a third arm which is attached to the other end portion of said second arm to be vertically movable along a third axis and to be rotatable about the third axis, and to a lower end of which hand means for holding parts is detachably attached;
    driving means for driving said first to third arms;
    control means for controlling said driving means; and
    wiring and piping means for supplying a control signal from said control means to said driving means, and for supplying a control signal and a working fluid from said control means to said hand means, said wiring and piping means including:
    a first fixing jig extending to a position above said first arm and above the first axis;
    a second fixing jig arranged on said second arm and on the second axis;
    a third fixing jig arranged on an upper end of said third arm and on the third axis;
    a first pipe, one end of which is connected on the first axis on said first fixing jig, the other end of which is connected to a position near the second axis on said second fixing jig, and through which a bundle of wiring and piping lines is inserted; and
    a second pipe, one end of which is connected to a position near the second axis on said second fixing jig, the other end of which is connected on the third axis on said third fixing jig, and through which the bundle of wiring and piping lines is inserted.

2. The industrial robot according to claim 1, wherein said driving means includes:
    a first driving motor, arranged in said base unit, for rotating said first arm;
    a second driving motor, arranged on said first arm, for rotating said second arm; and
    third and fourth driving motors, arranged on said second arm, for vertically moving, and rotating said third arm, respectively.

3. The industrial robot according to claim 2, wherein one end of a wiring line for supplying a signal to said second driving motor is connected on the first axis of said first fixing jig, and the other end thereof is spirally connected on the first axis of said first arm.

4. The industrial robot according to claim 1, wherein one end of said first pipe is stationarily connected to said first fixing jig, and the other end thereof is pivotally connected to said second fixing jig.

5. The industrial robot according to claim 2, wherein said third and fourth driving motors are stored in said second fixing jig.

6. The industrial robot according to claim 1, wherein said first fixing jigs includes:
    an upright portion mounted on said base unit;
    an inclined portion obliquely extending from an upper end of said upright portion; and
    a horizontal portion horizontally extending from a distal end of said inclined portion, wherein
    a distal end of said horizontal portion is located on the first axis.

7. The industrial robot according to claim 1, further comprising:
    attaching and detaching means, attached to a lower end of said third arm, for detachably attaching a hand.

8. The industrial robot according to claim 7, wherein said third arm is formed to be hollow, and
    the bundle of wiring and piping lines passes through said third arm via said third fixing jig, and is connected to said attaching and detaching means.

9. The industrial robot according to claim 8, wherein said attaching and detaching means comprises a cylindrical main body attached to the lower end of said third arm, and
    an opening portion is formed in said main body so as to guide the bundle of wiring/piping lines inserted into said main body via said third arm toward the outside said main body.

* * * * *

UNITED STATES PATENT AND TRADEMARK OFFICE
CERTIFICATE OF CORRECTION

PATENT NO. : 5,205,701

DATED : April 27, 1993

INVENTOR(S) : Hiroyuki Kigami, et al.

It is certified that error appears in the above-identified patent and that said Letters Patent is hereby corrected as shown below:

<u>ON THE COVER PAGE</u>
　　At [56], FOREIGN PATENT DOCUMENTS
　　　　"3/1962 Japan" should read --3/1987 Japan--;
　　　　"3/1963 Japan" should read --3/1988 Japan--; and
　　　　"7/1963 Japan" should read --7/1988 Japan--.

<u>COLUMN 20</u>

Line 36, "jigs" should read --jig--.

Signed and Sealed this

Fifth Day of April, 1994

*Attest:*

BRUCE LEHMAN

*Attesting Officer*　　*Commissioner of Patents and Trademarks*